(12) United States Patent
Light et al.

(10) Patent No.: US 9,501,467 B2
(45) Date of Patent: Nov. 22, 2016

(54) SYSTEMS, METHODS, SOFTWARE AND INTERFACES FOR ENTITY EXTRACTION AND RESOLUTION AND TAGGING

(75) Inventors: Marc Noel Light, Saint Paul, MN (US); Craig Alan Larson, Minneapolis, MN (US); Kevin Scott Koch, Grand Junction, CO (US); David Wayne DeMoss, Minneapolis, MN (US)

(73) Assignee: Thomson Reuters Global Resources (CH)

( * ) Notice: Subject to any disclaimer, the term of this patent is extended or adjusted under 35 U.S.C. 154(b) by 164 days.

(21) Appl. No.: 12/806,116

(22) Filed: Aug. 5, 2010

(65) Prior Publication Data

US 2012/0036130 A1   Feb. 9, 2012

Related U.S. Application Data

(63) Continuation-in-part of application No. 12/341,926, filed on Dec. 22, 2008.

(60) Provisional application No. 61/008,714, filed on Dec. 21, 2007, provisional application No. 61/063,047, filed on Jan. 30, 2008.

(51) Int. Cl.
*G06F 17/30* (2006.01)
*G06F 17/27* (2006.01)

(52) U.S. Cl.
CPC ......... *G06F 17/278* (2013.01); *G06F 17/2785* (2013.01); *G06F 17/30286* (2013.01)

(58) Field of Classification Search
CPC .. G06F 3/04883; G06F 17/211; G06F 17/28; G06F 17/30; G06F 17/30598; G06F 17/21; G06F 3/016; G06F 3/0488; G06F 17/278; G06F 17/30616; G06F 17/30286; G06F 17/30306; G06F 17/30684; G06F 8/458; G06F 8/75; G06F 17/30011; G06F 17/30392; G06F 17/30424; G06F 17/30663; G06F 17/30864; G06F 17/3086; G06F 17/2785
See application file for complete search history.

(56) References Cited

U.S. PATENT DOCUMENTS 5,287,278 A   2/1994   Rau
7,003,719 B1   2/2006   Rosenoff
(Continued)

FOREIGN PATENT DOCUMENTS

EP   1843256   10/2007
WO   WO-2005020091   3/2005
WO   WO-2007044350   4/2007

OTHER PUBLICATIONS

Jon Espen Ingvaldsen et al, "Financial News Mining: Monitoring Continuous Streams of Text", Web Intelligence, 2006. WI 2006.
(Continued)

*Primary Examiner* — Dinku Gebresenbet
(74) *Attorney, Agent, or Firm* — Duncan Galloway Egan Greenwald, PLLC; Kevin T. Duncan

(57) ABSTRACT

For automated text processing, the inventors devised, among other things, an exemplary system that includes an entity tagger, an entity resolver, a text segment classifier, and a relationship extractor. The entity tagger receives an input text segment, and tags named entities with the segment as being a person, company, or place. The entity resolver accesses authority files, and associates the persons and companies named in the text segment with specific entries in the files. The text segment classifier determines whether the text segment includes a relationship event, such as job-change event or merger and acquisition event, and if an event is detected, the relationship extractor determines the event role of entities named in the segment. For example, the extractor determines for a merger and acquisition event, which named company was the acquirer and which was acquired.

29 Claims, 17 Drawing Sheets

(56) References Cited

U.S. PATENT DOCUMENTS

| | | | |
|---|---|---|---|
| 7,124,031 | B1 | 10/2006 | Hoffman |
| 7,333,966 | B2 | 2/2008 | Dozier |
| 7,630,947 | B2 | 12/2009 | Pandya |
| 2003/0130837 | A1* | 7/2003 | Batchilo et al. ................ 704/9 |
| 2003/0135826 | A1 | 7/2003 | Dozier |
| 2003/0154208 | A1 | 8/2003 | Maimon |
| 2004/0210443 | A1 | 10/2004 | Kuhn |
| 2005/0102259 | A1 | 5/2005 | Kapur |
| 2005/0131935 | A1* | 6/2005 | O'Leary et al. ............. 707/102 |
| 2005/0137899 | A1* | 6/2005 | Davies et al. .................... 705/1 |
| 2005/0234968 | A1* | 10/2005 | Arumainayagam et al. . 707/102 |
| 2005/0240653 | A1* | 10/2005 | Anglero ........................ 709/203 |
| 2006/0052945 | A1 | 3/2006 | Rabinowitz |
| 2006/0253274 | A1* | 11/2006 | Miller ............................... 704/9 |
| 2006/0277168 | A1 | 12/2006 | Hammond et al. |
| 2007/0005578 | A1 | 1/2007 | Patman |
| 2007/0276854 | A1 | 11/2007 | Gold |
| 2009/0187567 | A1 | 7/2009 | Rolle |
| 2009/0222395 | A1 | 9/2009 | Light et al. |
| 2009/0299796 | A1* | 12/2009 | Pai .................... G06Q 30/0201 705/7.29 |

OTHER PUBLICATIONS

International Search Report, PCT/US2008/088040, Feb. 6, 2009.

David Nadeau, "A survey of named entity recognition and classification".

Rau L F Ed—IEEE: "Extracting company names from text", Proceedings of Conference on AI Applications, Miami Beach, Feb. 24-28, 1991.

Ing Xiao et al: "A global rule induction approach to information extraction", Proceedings 15th IEEE International Conference on Tools with Artificial Intelligence. ICTAI 2003.

Teresa Chung, et al., "Identifying Technical Vocabulary", System vol. 32, 2004 pp. 251-263.

Christopher Dozier, et al., "Automatic Extraction and Linking of Person Names in Legal Text", Proceedings of RIAO, Apr. 2000, p. 1305-132.

Yang Huizhong, "A new technique for identifying scientific/technical terms and describing science texts", Journal of ASsoc for Literary and Linguistic Comp., vol. 1 pp. 93-103.

PCT International Search Report, PCT/US11/01391, Dec. 19, 2011, 10 pgs.

* cited by examiner

FIGURE 11

SYSTEMS, METHODS, SOFTWARE AND INTERFACES FOR ENTITY EXTRACTION AND RESOLUTION AND TAGGING

RELATED APPLICATIONS

This application claims priority to U.S. Provisional Application 61/008,714 which was filed Dec. 21, 2007, to U.S. Provisional Application 61/063,047 which was filed Jan. 30, 2008, and to U.S. Ser. No. 12/341,926 filed Dec. 22, 2008, all three of which patent applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright 2007-20010, Thomson Reuters Global Resources.

TECHNICAL FIELD

Various embodiments of the present invention concern extraction of data and related information from documents, such as identifying and tagging names and events in text and automatically inferring relationships between tagged entities, events, and so forth.

BACKGROUND

With the advents of the printing press, typeset, typewriting machines, computer-implemented Word processing and mass data storage, the amount of information generated by mankind has risen dramatically and with an ever quickening pace. As a result there is a continuing and growing need to collect and store, identify, track, classify and catalogue, and link for retrieval and distribution this growing sea of information.

In many areas and industries, including the financial and legal sectors and areas of technology, for example, there are content and enhanced experience providers, such as The Thomson Reuters Corporation. Such providers identify, collect, analyze and process key data for use in generating content, such as law related reports, articles, etc., for consumption by professionals and others involved in the respective industries, e.g., lawyers. Providers in the various sectors and industries continually look for products and services to provide subscribers, clients and other customers and for ways to distinguish their firms over the competition. Such providers strive to create and provide enhance tools, including search and ranking tools, to enable clients to more efficiently and effectively process information and make informed decisions.

In particular, for example, legal professionals in the US and abroad are often involved in litigation, arbitration, mediation, administrative proceedings and other evidentiary processes wherein large amounts of information is collected. For instance, in a litigation there are often numerous depositions in which thousands and thousands of pages of recorded, videotaped, and transcribed testimony is collected. It is a constant need in the legal community to most efficiently and effectively track, edit, search and otherwise access and use such voluminous materials and information for use in providing legal services. For instance, an attorney preparing for trial often desires to prepare and outline for interrogating a witness. The attorney and/or paralegal typically pours through the deposition transcripts and videotapes associated not only with the witness being deposed but others to identify areas of questioning and past and potential responses. In addition to testimony, the attorney must consider and attempt to identify, collect and incorporate into the witness outline a vast collection of pleadings, documents, exhibits, etc., for planning and for fast and effective reference and possible display at and during trial. For instance, where an attorney is questioning a witness at trial it is a recognized need to be able to reference the past testimony of the witness and others to good effect and to quickly locate and present, such as by overhead projector, video screen, Elmo and other means, documents as exhibits to assist in the questioning and presentation of evidence to a jury or other fact-finder.

In addition, there is a need in the legal community to be able to quickly reference research, including case law, controlling or relevant to a particular issue that is the subject of questioning at trial or deposition or the subject of presentation, such as to an appellate court, administrative body, or otherwise. The legal professional is concerned with researching an ever-expanding body of legislation and judicial opinions and in tracking and associating such research to issues related to disputes to assist them understanding and resolving new or potential disputes. To facilitate this research, Information Service Provider (ISP) concerns, such as West Publishing Company of St. Paul, Minn. (a Thomson Reuters business), collect legal statutes, judicial opinions, law articles, and other legal and non-legal materials and make these available electronically over a computer network, e.g., the Westlaw® online research system. (Westlaw is a trademark of Thomson Reuters West.) At least one problem the present inventors recognized with this powerful system as well as other online research systems is that ISP's valuable functionality, while highly effective in researching and preparing legal documents, is not as readily available to a legal professional involved in real time activities, such as depositions and taking witnesses at trial.

West provides a service called LiveNote that provides to users: live feed of a transcript, audio and video directly on the attorney's or user's computer; streaming live transcript, audio and video feed off-site to remote participants; effective management of transcripts and related evidence in a case; performing sophisticated full-text searches across transcripts in a case to quickly retrieve critical testimony; highlight, annotate and analyze all transcripts; view hyperlinked exhibits; create dynamic reports on keywords, issues, annotations and exhibit lists that will automatically update as a case evolves; quickly prepare PowerPoint slides of transcript text synced with video to present at trial, hearings, or meetings; shared cases over a network so multiple team members can work simultaneously, or save a project locally and synchronize your work to the network case at a later time; control of a deposition or hearing, integrating innovative technology with realtime resources; and enables swift, efficient and secure online collaboration at various locations.

West LiveNote may also be used in an online fashion, e.g., LiveNote Web, to provide users additional access and functionality. Remote Access Server (RAS) is an additional online type service similar to LiveNote Web. Typically, LiveNote Web and RAS, as well as other such systems, allow users with subscriptions to login to a case over the World Wide Web. After logging in, users may download case information, including transcripts and documents, to their computers and work from a web-based or local application, such as West LiveNote.

The present inventors recognized a need to provide information consumers relational and event information about entities, such as companies, persons, cities, that are mentioned in electronic documents. For example, documents, such as news feeds, SEC (Securities and Exchange Commission) filings or scientific articles, may indicate that Company A merged with Company B, that Lawyer C moved to Firm D, or that the interaction of protein E with protein F produces result G.

However, automatically discerning the relational and event information about these entities is difficult and time consuming even with state-of-the art computing equipment, because an event description can be found in a single sentence or spread out over a paragraph, a document or an entire collection of documents.

SUMMARY

To address this and/or other needs, the present inventors devised, among other things, systems and methods for named-entity tagging, resolving and event and relationship extraction.

The present invention addresses the above discussed needs as well as others by incorporating, linking or otherwise accessing the vast amounts of documents, testimony and data collected over the course of a litigation or other proceeding as well as harnessing the research resources of an ISP for use in outlining and presenting and eliciting testimony and evidence, such as at trial. For example, with advancements in technology and sophisticated approaches to searching across vast amounts of data and documents, e.g., database of evidence, testimony, documents, case law, statutes and laws, regulations, etc., professionals and other users increasingly rely on Information Service Provider (ISP) networks or websites, such as over the Internet, and that perform functions based on text included in a document being created or edited on a Word processing system. For example, in preparing an outline for deposition or trial a legal professional may utilize a word processor application or component and highlight, tag, insert links or references to video, insert links or references to documents, insert links or references to case law, briefs or pleadings, etc., in preparing such documents. ISPs may provide an applet or application executing locally on the user's computer that interfaces with the ISP network-based system and that may be used separate and standalone. For example, at trial a legal team may have onsite a database(s) of documents, testimony, videotape, exhibits, etc., in electronic form. Also onsite, the team may have one or more computers connected to display technology to present information, documents, videotape, etc., accessible from the database.

In one embodiment, the present invention provides an Outline feature for use in a computer/software-based Litigation Support System ("LSS"), such as Thomson Reuters Corporation's West LiveNote and West Case Notebook software-based products. The outline feature operates within the LSS to allow users to make outlines of cases and to perform other enhanced functions. Although discussed in terms of certain proprietary systems, it is understood that the invention is not limited to such proprietary implementations and applies to any suitable LSS system and broadly to such professional services provider systems. For instance, West Case Notebook is a software program that helps attorneys keep all case-related documents in one place while they perform all the necessary parts of litigation. Built on West's LiveNote platform, West Case Notebook easily integrates with Westlaw. Any research done on Westlaw® can be moved into a Case Notebook file, where users can annotate, search and report on the research and other documents.

West Case Notebook provides the following user enhancements: organize case documents, pleadings, legal research and information about "characters", i.e., individuals or organizations connected to the case; classify case documents, research and information by annotating notes and pre-defined, color-coded issues; export Westlaw research with comments, issue tags KeyCite status and live links directly into a Case Notebook file; receive realtime feed at depositions or court and leave with a usable electronic transcript saved into a legal team's case file; locate information quickly with summary reports on specific issues or data, and with flexible full text searching targeted to particular data sets such as specific transcripts or documents; organize sub-sets of documents and information using data groups; and remote access to case file.

West Case Notebook, as well as other such systems, organizes all essential case information in a centralized electronic database. This allows a legal team to enter and share key facts, documents, main characters, evidence, pleadings, legal research and more. Case Notebook users are able to easily search for and find "characters", i.e., the names of major participants in cases or are people involved in cases, and associated information, e.g., "character information." These "characters" may be directly input into the system or may be derived or "found" by the system in processing documents such as transcripts, case law, etc. The system "tags" or "pins" or otherwise associates references with the characters and provides tools that allow users to research the names or "characters" for a variety of purposes.

More particularly, the system of the present invention creates and inserts "Character Smart Tags" or "Smart Tags" for associating characters with documents, exhibits, testimony, outline information, etc., e.g., metadata. The names of characters input into or found by the system, such as appearing in transcripts, documents, and pleadings, are marked, such as by underlining, highlighting, etc., for perception and action by the user. For instance, a user right-clicking an underlined name will open a context menu. The underlines are referred to as Character Smart Tags or simply Smart Tags. For purposes of this explanation and meaning of the invention, the term "document" should be given a broad meaning to include all of the above mentioned items in whatever form and including "redacted documents" and further including a collection or corpus of documents.

The present invention provides character maintenance functionality based on software or program code (Entity Maintenance Module—EMM) that, in one implementation, is embedded in an LSS, e.g., West LiveNote Case Notebook, and will recognize the names of people (referred to as characters) involved in a specific case. The character maintenance of EMM aspect of the LSS will search for names in the properties of documents, pleadings, and transcripts. It will search the text of transcripts and perform a character recognition process, such as by use of Adobe Acrobat or similar technology, to "OCR" the documents and pleadings, and list the primary name in, for example, a Character Display pane. EMM, working within an LSS, e.g., West LiveNote Case Notebook, will underline the primary names and their variants (referred to as aliases). Users will be able to access Smart Tag context menus for more information about the character, including data on Westlaw. Users will also have the option to turn off automated Character Smart Tag creation and create Smart Tags manually. The system may use any of a variety of xML-based rules or constructs or other suitable schemas or formats in encoding documents or files.

The LSS may be integrated with or incorporate other services to enhance and leverage reporting and legal videography litigation functions. For example, West Case LiveNote is the legal industry's benchmark for transcript and evidence management and may be used in conjunction with reporting services, such as West Court Reporting Services. Such integrated systems may include or interface with word processing or other software for text editing. The invention allows users to insert copied text from transcripts, copied text from documents and pleadings, annotation text, questions and answers from transcripts, and electronic outlines. The outline feature may be implemented as a software-based add-on to an existing subscription-based service or product. For example, a "Transcript Summary" feature may be an add-on to Case Notebook subscribers that allows users to type summaries for specific lines of transcripts.

An exemplary system includes an entity tagger, an entity resolver, a text segment classifier, and a relationship extractor. The entity tagger receives an input text segment, and tags named entities with the segment as being a person, company, or place. In response, the entity resolver accesses an authority files, and associates the persons and companies named in the text segment with specific entries in the authority files. The text segment classifier determines whether the entity tagged and resolved text segment includes a relationship event, such as job-change event or merger and acquisition. For a text segment that includes the relationship event, the relationship extractor determines the role of named entities in the text segment within the event. For example, the extractor determines for a merger and acquisition event, which named company was the acquirer and which was acquired.

In a first embodiment the present invention provides a computer-implemented method comprising: accessing a preexisting entity list; analyzing a first document to detect an entity, the entity comprising a person, place, or organization, the first document being associated with a current legal event; resolving the entity with the preexisting entity list and: if the entity is not present in the preexisting entity list, adding the entity to the preexisting entity list and generating a first set of relationship data associated with the relationship between the first document and the entity; or if the entity is present in the preexisting entity list, generating a first set of relationship data associated with a relationship between the first document and the entity; repeating the resolving step for each distinct entity detected in the first document; and storing the first set of relationship data. The method further characterized by the detected entity is one of the group consisting of attorney names, judge names, courts, names of parties to a lawsuit, expert names, witness names, and law firm names. The method further characterized by the first set of relationship data includes a first set of location data representing one or more locations in the first document in which the entity appears.

In a second embodiment, the present invention provides a computer-implemented method comprising: accessing a preexisting entity list; analyzing a first document to detect an entity, the entity comprising a person, place, or organization, the first document being associated with a current legal event; resolving the detected entity with the preexisting entity list and, if the detected entity is not present in the preexisting entity list, generating a list of new entities; generating respective sets of relationship data representing a relationship between the first document and each respective detected entity; repeating the resolving step for each distinct entity detected in the first document and adding each distinct entity not present in the preexisting entity list to the list of new entities; and storing the respective sets of relationship data. The method further characterized by displaying a user interface adapted to allow a user to select and/or deselect one or more of the new entities.

In a third embodiment, the invention provides a computer useable medium having a set of executable code for enabling electronic communications between a Word processing program of a client access device and an information services provider system (ISP), the set of executable code comprising: a first set of computer program code adapted to access a preexisting entity list; a second set of computer program code adapted to analyze a first document to detect an entity, the entity comprising a person, place, or organization, the first document being associated with a current legal event; a third set of computer program code adapted to resolve the entity with the preexisting entity list and: if the entity is not present in the preexisting entity list, adding the entity to the preexisting entity list and generating a first set of relationship data associated with the relationship between the first document and the entity; or if the entity is present in the preexisting entity list, generating a first set of relationship data associated with a relationship between the first document and the entity; a fourth set of computer program code adapted to repeat the resolving step for each distinct entity detected in the first document; and a fifth set of computer program code adapted to store the first set of relationship data. The computer useable medium further characterized by a sixth set of computer program code adapted to generate smart tags based on the first set of relationship data, whereby subsequent display of the first document includes displaying a set of smart tags at a set of locations in the first document associated with the entity. The computer useable medium further characterized by a seventh set of computer program code adapted to generate, in response to a report request, a signal based upon the set of smart tags; and an eight set of computer program code adapted to generate a computer display associated with the signal.

In a fourth embodiment, the invention provides a computer-implemented method comprising: analyzing a first document to detect entities appearing in the document, the first document being associated with an event; detecting a first entity in the first document; generating a first set of relationship data representing a relationship between the first document and the detected first entity; comparing the detected first entity with a set of entity data derived from an existing authority database of known entities; and updating the authority database of known entities including storing the first set of relationship data.

BRIEF DESCRIPTION OF THE DRAWINGS

FIGS. 6-19 illustrate a series of screen shots associated with the user interface aspects and control aspects and display aspects corresponding to one or more embodiments of the present invention.

DETAILED DESCRIPTION OF THE EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Named-Entity Tagging and Resolution System

Figure 1:
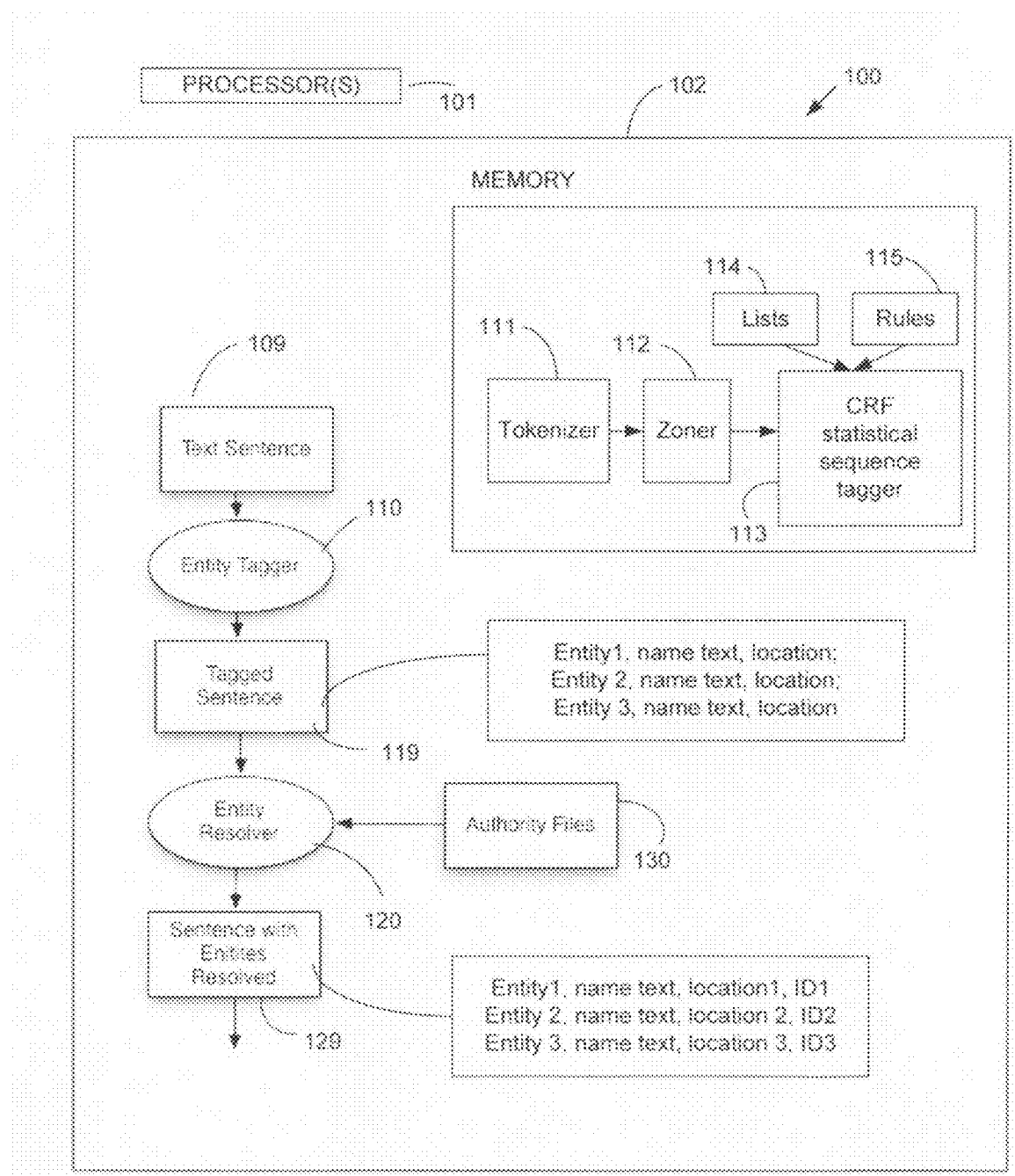
FIG. 1 is a block and flow diagram of an exemplary system for named-entity tagging, resolving and event extraction, which corresponds to one or more embodiments of the present invention.

FIG. 1 shows an exemplary named entity tagging and resolving system 100. In addition to processors 101 and a memory 102, system 100 includes an entity tagger 110, an entity resolver 120, and authority files 130. (Tagger 110, resolver 120, and authority files 130 are implemented using machine-readable data and/or machine-executable instructions stored on memory 102, which may take a variety of consolidated and/or distributed forms.

Entity tagger 110, which receives textual input in the form of documents or other text segments, such as a sentence 109, includes a tokenizer 111, a zoner 112, and a statistical tagger 113.

Tokenizer 111 processes and classifies sections of a string of input characters, such as sentence 109. The process of tokenization is used to split the sentence or other text segment into word tokens. The resulting tokens are output to zoner 112.

Zoner 112 locates parts of the text that need to be processed for tagging, using patterns or rules. For example, the zoner may isolate portions of the document or text having proper names. After that determination, the parts of the text that need to be processed further are passed to statistical sequence tagger 113.

Statistical sequence tagger 113 (or decoder) uses one or more unambiguous name lists (lookup tables) 114 and rules 115 to tag the text within sentence 109 as company, person, or place or as a non-name. The rules and lists are regarded herein as high-precision classifiers.

Exemplary pattern rules can be implemented using regex+ Java, Jape rules within GATE, ANTLR, and so forth. A sample rule for illustration dictates that "if a sequence of words is capitalized and ends with "Inc." then it is tagged as a company or organization. The rules are developed by a human (for example, a researcher) and encoded in a rule formalism or directly in a procedural programming language. These rules tag an entity in the text when the preconditions of the rule are satisfied.

Exemplary name lists identify companies, such as Microsoft, Google, AT&T, Medtronics, Xerox; places, such as Minneapolis, Fort Dodge, Des Moines, Hong Kong; and drugs, such as Vioxx, Viagra, Aspirin, Penicillin. In the exemplary embodiment, the lists are produced offline and made available during runtime. To produce the list, a large corpus of documents, for example, a set of news stories, is passed through a statistical model and/or various rules (for example, a CRF model) to determine if the name is considered unambiguous. Exemplary rules for creating the lists include: 1) being listed in a common noun dictionary; and 2) being used as company name more than ninety percent of the time the name is mentioned in a corpus. The lookup tagger also finds systematic variants of the names to add to the unambiguous list. In addition, the lookup tagger guides and forces partial solutions. Using this list assists the statistical model (the sequence tagger) by immediately pinning that exact name without having to make any statistical determinations.

Examples of statistical sequence classifiers include linear chain conditional random field (CRF) classifiers, which provide both accuracy and speed. Integrating such high precision classifiers with the statistical sequence labeling approach entails first modifying the feature set of the original statistical model by including features corresponding to the labels assigned by the high-precision classifiers, in effect turning "on" the appropriate label features depending on the label assigned by the external classifier. Second, at run time, a Viterbi decoder (or a decoder similar in function) is constrained to respect the partially labeled or tagged sequences assigned by the high-precision classifiers.

This form of guided decoding provides several benefits. First, the speed of the decoding is enhanced, because the search space is constrained by the pretagging. Second, results are more consistent, because three sources of knowledge are taken account: the lists, the rules, and trained decoder statistical model. The third benefit is an ease of customization that stems from an elimination of a need to retrain the decoder if new rules and list items are added.

Figure 2:
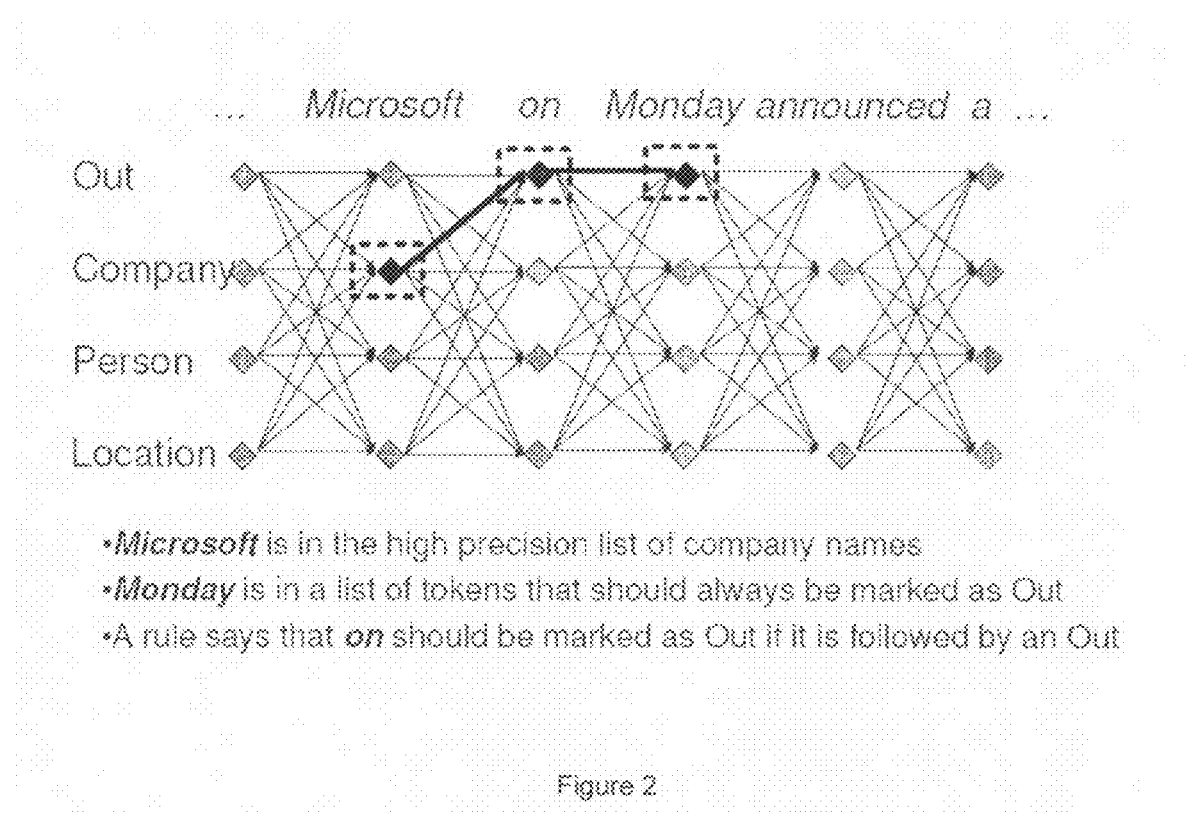
FIG. 2 is a diagram illustrating guided sequence decoding for named-entity tagging which corresponds to one or more embodiments of the present invention.

FIG. 2 is a conceptual diagram showing how a text segment "Microsoft on Monday announced a" is pretagged and how this pretagging (or pinning) constrains the possible tags or labeling options that a decoder, such as Viterbi decoder, has to process. In the Figure, the term Microsoft is tagged or pinned as a company based on its inclusion in a list of company names; the term Monday is marked as "out" based on its inclusion of a list of terms that should always be marked as "out"; and the term "on" is marked as out based on a rule that it should be marked as "out", if it is followed by an term that is marked as "out" in this case the term "Monday."

In the exemplary embodiment, the statistical sequence tagger calculates the probability of a sequence of tags given the input text. The parameters of the model are estimated from a corpus of training data, that is, text where a human has annotated all entity mentions or occurrences. (Unannotated text may also be used to improve the estimation of the parameters.) The statistical model then assembles training data, develops a feature set and utilizes rules for pinning. Pinning is a specific way to use a statistical model to tag a sequence of characters and to integrate many different types of information and methods into the tagging process.

The statistical model locates the character offset positions (that is, beginning and end) in the document for each named entity. The document is a sequence of characters; therefore, the character offset positions are determined. For example, within the sentence "Hank's Hardware, Inc. has a sale going on right now," the piece of text "Hank's Hardware, Inc." has an offset position of (0, 20). The sequence of characters has a beginning point and an ending point; however the path in between those points varies.

After the character offset positions are located, information about the entity is identified through the use of features. This information ranges from general information (that is, determining text is last name) to specific information (e.g., unique identifier). The exemplary embodiment uses the features discussed below, but other embodiments use other types and numbers amounts of features:

- Regular expressions: contains an uppercase letter, last char is a dot, Acronym format, contains a digit, punctuation
- Single word lists: last names, job titles, loc words, etc.
- Multi-word lists: country names, country capitals, universities, company names, state names, etc.
- Combination features: title@-1 AND (firstname OR last)
- Copy features: copies features from one token to neighboring tokens, for example, the token two to the left of me is capitalized (Cap@-2)
- The word itself features: "was" has the feature was@0
- First-sentence features: copy features from 1st sentence words to others
- Abbreviation feature: copy features of name to mentions of abbr.

The features computation does not calculate features for isolated pinned tokens. The computations combine hashes, combine tries, and combine regular expressions. Features are only computed when necessary (for example punctuation tokens are not in any hashes so do not look them up). Once the model has been trained, the Viterbi algorithm (or an algorithm similar in function) is used to efficiently find the most probable sequence of tags given the input and the trained model. After the algorithm determines the most probable sequence of tags, the text, such as tagged sentence 119, where the entities are located is passed to a resolver, such as entity resolver 120.

Entity resolver 120 provides additional information on an entity by matching an identifier for an external object within authority files 130 to which the entity refers. The resolver in the exemplary embodiment uses rules instead of a statistical model to resolve named entities. In the exemplary embodiment, the external object is a company authority file containing unique identifiers. The exemplary embodiment also resolves person names.

The exemplary resolver uses three types of rules to link names in text to authority file entries: rules for massaging the authority file entries, rules for normalizing the input text, and rules for using prior links to influence future links. Other embodiments include integrating the statistical model and resolver.

This list along with the original text is the input to an entity resolver module. The entity resolver module takes these tagged entities and decides which element in an authority file the tagged entity refers. In the exemplary embodiment, authority file 130 is a database of information about entities. For example an authority file entry for Swatch might have an address for the company, a standard name such as Swatch Ltd., the name of the current CEO, and a stock exchange ticker symbol. Each authority file entry has a unique identity. In the previous example a unique id could be, ID:345428, "Swatch Ltd.", Nicholas G. Hayek Jr., UHRN.S. The goal of the resolver is to determine which entry in the authority file matches corresponds a name mention in text. For example, it should figure out the Swatch Group refers to entity ID:345428. Of course, resolving names like Swatch is relatively easy in comparison to a name like Acme. However, even for names like Swatch, a number of related but different companies may be possible referents. What follows is a heuristic resolver algorithm used in the exemplary embodiment:

---

Heuristic Resolver Algorithm for Companies

Iterate through entities tagged by the CRF:
If entity tagged as ORG:
If a "do not resolve" ORG (i.e., stock exchange abbreviations):
set ID attribute to "NOTRESOLVED"
Else:
If entity in the company authority file,
set ID attribute to company ID
Else:
set ID attribute to "NOTRESOLVED"
Iterate through NOTRESOLVED entities:
If E is a left-anchored substring of a resolved company:
set ID attribute to already resolved company substring match ID,
change the tag kind to ORG, if necessary
If E is an acronym of an already-resolved company:
set ID attribute to already resolved non-acronym company ID,
change the tag kind to ORG, if necessary

---

Note that the exemplary entity tagger and variations thereof is not only useful for named entity tagging. Many important data mining tasks can be framed as sequence labeling. In addition, there are many problems for which high precision (but low recall) external classifiers are available that may have been trained on a separate training set.

Exemplary Event and Relationship Extraction System

Figure 3:
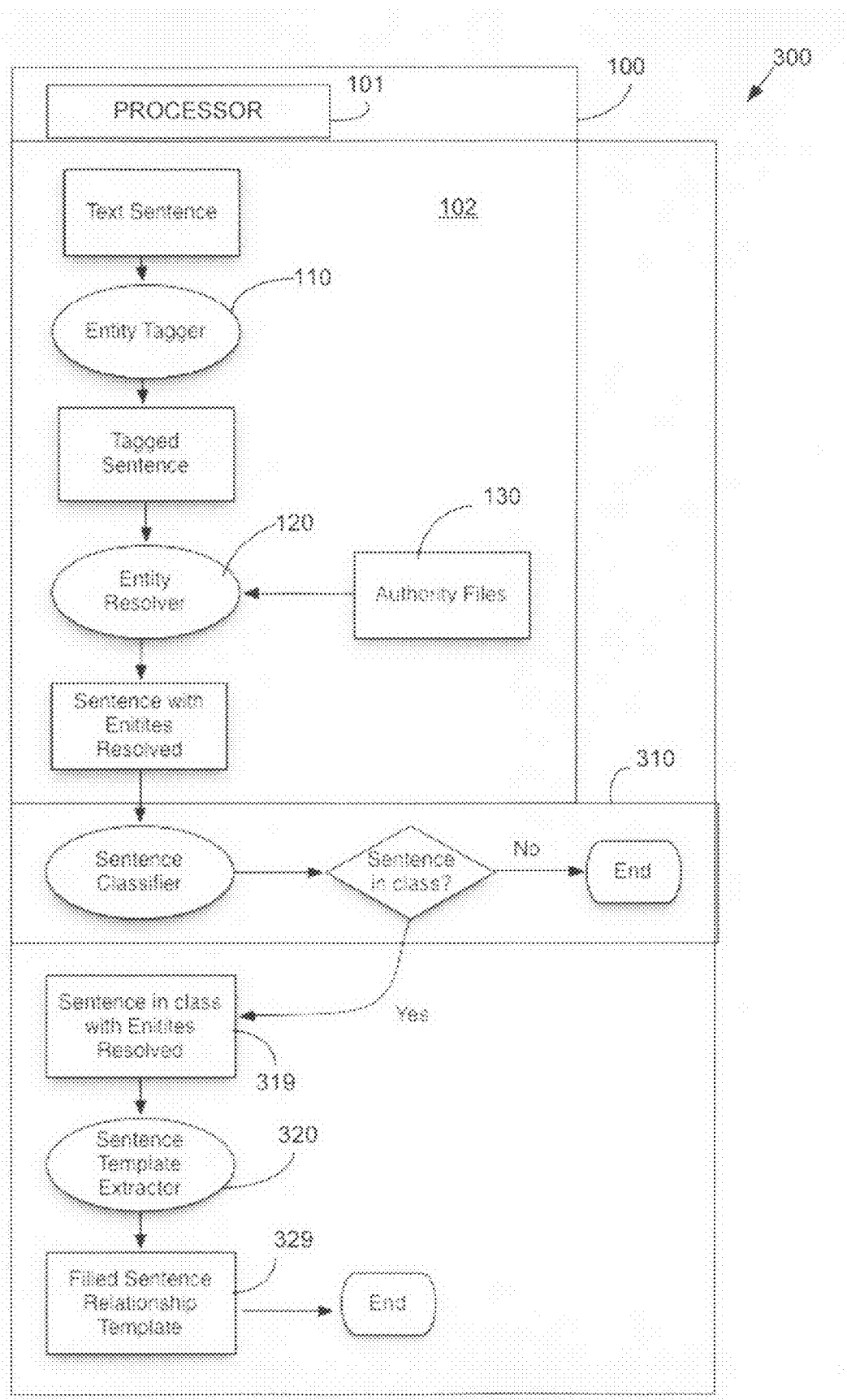
FIG. 3 is a block diagram of an exemplary named-entity tagging, resolution, and event extraction system corresponding to one or more embodiments of the present invention.

FIG. 3 shows an exemplary system 300 which builds onto the components of system 100 with a classifier 310 and a template extractor 320, which are shown as part of memory 102, and understood to be implemented using machine-readable and machine-executable instructions.

Classifier 310, which accepts tagged and resolved text such as sentence 129 from resolver 120, identifies sentences that contain extractable relationship information pertaining to a specific relationship class. For example, if one is interested in the hiring relationship where the relationship is hire(firm, person), the filter (or classifier) 312 identifies sentence (1.1) as belonging to the class of sentences containing a hiring or job-change event and sentence (1.2) as not belonging to the class.

(1.1) John Williams has joined the firm of Skadden & Arps as an associate.

(1.2) John Williams runs the billing department at Skadden & Arps.

The exemplary embodiment implements classifier 310 as a binary classifier. In the exemplary embodiment, building this binary classifier for relationship extraction entails:

1) Extracting articles from a target database;
2) Splitting sentences in all articles and loading to a single file;
3) Tagging and resolving types of entities relevant to a relationship type that occur within each sentence;
4) Selecting from set of sentences all sentences that have the minimal number of tagged entities needed to form a relationship of interest.

This means for example that at least one person name and one law firm name must be specified in a sentence for it to contain a job change event. Sentences containing requisite number of tagged entity types are called candidate sentences; 5) Identifying 500 positive instances from the candidate set and 500 negative instances. A sentence in the candidate set that actually contains a relationship of interest is called a positive instance. A sentence in the candidate set that does not contain a relationship of interest is called a negative instance. All sentences within the candidate set are either positive or negative instances. These sampled instances should be representative of their respective sets and should be found as efficiently as possible;

6) Creating classifier that combines selected features with selected training methods.

Exemplary training methods include naive bayes and Support Vector Machine (SVM.) Exemplary features include co-occurring terms and syntax trees connecting relationship entities; and 7) Testing the classification of randomly selected sentences from candidate pool.

After testing the exemplary embodiment evaluates first hundred sentences classified as positive (for example, job change event containing) and first hundred classified as negative, computing precision and recall and saving evaluated sentences as gold data for future testing.

A range of filters that are either document-dependent filters or complex relation detection filters based on machine learning algorithms are developed and tools that easily retarget new document types. The structure of a document type provides very reliable clues on where the sought after information can be found. Ideally, the filter is flexible and automatically detects promising areas in a document. For example, a filter that includes a machine learning tool (for example Weka) that detects promising areas and produces pipelines that can be changed according to the relevant features needed for the task.

Depending on the requirements, different levels of co-reference resolution can be implemented. In some domains, no co-reference resolution is used. Other situations use a relatively simple set of rules for co-reference resolution, based on recent mentions in the text and identifiable attributes (i.e., gender, plurality, etc.) of the interested named entities. For example, in the job change event, almost all co-reference issues are solved by simply referring backward to the most recent mention of the matching entity type (that is, law firm or lawyer name).

Template extractor 320 extracts event templates from positively classified sentences, such as sentence 319, from classifer 310. In the exemplary embodiment, extracting templates from sentences involves identifying the name entities participating in the relationship and linking them together so that their respective roles in the relationship are identified. A parser is utilized to identify noun phrase chunks and to supply a full syntactic parse of the sentence.

In the exemplary embodiment, implementing extractor 320 entails:

1) Create gold data by taking positive example sentences from classification phase and manually generating appropriate template records. The user is automatically presented with all possible templates which could be generated from the sentence and asking the user to select the one that is correct;

2) Take 400 sentences from gold data set for training data and develop extraction programs based on one or more of the following technologies: association rules, chunk kernel based on chunks, CRF, and tree kernel based on syntactic structure;

3) Test solutions on 100 held out test samples;

4) Combine classifier with extractor to test precision using unseen data.

For instance, a sentence containing a job change event is one that describes an attorney joining a law firm or other organization in a professional capacity. The target corpora from which job change events are extracted are legal newspaper databases. The minimal number of tagged entities which qualify a sentence for inclusion in the candidate set is one lawyer name and one legal organization name. One way to efficiently collect positive and negative training instances is to stratify samplings. This can be done by sorting the sentences according to the head word of the verb phrase that connects a person with a law firm in the sentence. Then collect all head verbs that occur at least five times under a single bucket. After collection, select five example sentences from each bucket randomly and mark them as either positive or negative examples. For each bucket that yields only positive examples, add all remaining instances to the positive example pool. And for each bucket that yields only negative examples, add all examples to the negative examples group. If there are less than 500 positive examples or less than 500 negative examples, manually score randomly selected sentences until 500 examples of each time are identified. The job change event extractor moves identified entities from a positively classified job change event sentence into a structured template record. The template record identifies the roles the named entities and tagged phrases play in the event.

The template below (which also represents a data structure) is in reference to sentence 1.1 above.

| Role | Value | Entity ID |
|---|---|---|
| Attorney | John Williams | A23456 |
| Firm | Skadden & Arps | F56748 |
| Position | Associate | P234 |

In another embodiment, classifer 310 determines whether tagged and resolves sentences (or more generally text segments) from entity resolver 120 include a merger and acquisitions event, that is, an event in which one company merges with or acquires another company. The target corpora for extracting merger and acquisition events are financial news wire articles. The minimal number of tagged entities which qualifies a sentence for inclusion in the candidate set is two company names. To help collect training data, utilize structured records from merger and acquisitions database on Westlaw® information-retrieval system (or other suitable information-retrieval system) to identify merger and acquisition events that have taken place in the recent past.

To efficiently identify positive training instances from the candidate set, find sentences that contain the names of entities that match these records and were published during the time frame over which the merging event took place. To identify negative instances, select sentences that contain companies are known to not have been involved in a merger or acquisition. The merger and acquisition (M & A) event extractor moves identified entities from a positively classified M & A change event sentence into a structured template record. The template record identifies the roles the named entities and tagged phrases play in the event.

Another embodiment classifies and extracts net income announcement events in sentences. A net income announcement event occurs when a company announces it has expected or actualized net income over a specific time frame. The target corpora for extract merger and acquisition events are financial news wire articles. The minimal number of tagged entities which qualifies a sentence for inclusion in the candidate set is one company name and the phrase "net income" or the word "profit". To efficiently find positive instances, extract net income information from SEC documents for particular companies and find positive candidates when the named company in the sentence and the dollar amount or percentage increase in profit for a time period line up with information from an SEC document. Negative instances are found when the data for a particular company does not line up with SEC filings. The net income announcement event extractor moves identified entities from a positively classified net income announcement event sentence into a structured template record. The template record identifies the roles the named entities and tagged phrases play in the event.

An additional embodiment of the present invention includes a tool that generates sentence paraphrases starting from the seed templates provided by a user. The tool takes sentences that indicate an event with high precision with the actual entities replaced by their generic types. The sentence is searched for in a corpus and the actual entity identities are obtained. Then other sentences are located with the same entities in the corpus (perhaps in a narrow time window) which saves as paraphrases for the initial sentence. This step can now be repeated with the newly acquired sentences. The sentences can be ordered according to frequencies of component phrases and manually checked to generate gold data.

Various assumptions are incorporated in the exemplary embodiment. One main assumption is that the identity of the entities is usually independent of the way of talking about an event or relationship. Another assumption is that the extraction of sentences deemed paraphrases based upon the equality of constituent entities and time window is relatively error-free. The precision of this latter filtering step is improved by having other checks such as on the cosine similarity between the documents in which the two sentences are found, similarity of titles of the documents etc. This approach entails the following:
1) Providing a large corpus of documents preferably having the property that several documents talking about the same event or relationship from different authors are easy to find. One example is a time-stamped news corpus from different news sources, where the same event is likely to be covered by different sources;
2) Using a named entity recognizer to tag the entities in the corpus with reasonable accuracy. Cleary the set of entities that need to be covered by the NER (named-entity resolver) depends upon the extraction problem;
3) Providing an indexer for efficient search and retrieval from the corpus;
4) Providing a human generated list of high-precision sentences with the entities replaced by wild-cards. For example, for MA, a human might provide a rule "ORG1 acquired ORG2" means this is an MA sentence with ORG1 being the buyer and ORG2 being the target.

Another embodiment entails extraction of information from tables found in text. An SVM classifier (or another classifier similar in function) distinguishes tables from non-tables. Tables that are only used for formatting reasons are identified as non-tables. In addition, tables are classified as tables of interest, such as background, compensation, etc. The feature set comprises text before and after the tables as well as n-grams of the text in the table. The tables of interest are then processed according to the following:
1) label/value detection. The table has to be partitioned in the labels and the values. For the exemplary table below, the system determines that the money amounts are values and the rest are labels;
2) label grouping. Some labels are grouped together. For example, Eric Schmidt and his current position are one label.

On the other hand, a table that contains a year and a list of term names (i.e. Winter, Spring, Fall) are not grouped together;
3) abstract table derivation. A derived Cartesian coordinate system leads to the notation that defines every value accordingly. [Name and Principal Position.Eric Schmidt Chairman of the Executive Committee and Chief Executive Officer.Year.2005, Annual Compensation.Salary($)]=1;
4) relation extraction. Given the abstract table representation, the desired relations are derived. The compensation relation, for example, is filled with: NAME: Eric Schmidt; COMPENSATION TYPE: salary; AMOUNT: 1; CURRENCY: $. Finally, an interpreter for the tables of interest is created. The input to the interpreter is a table and the output is a list of relations represented by the table.

| | | Annual Compensation | | |
| --- | --- | --- | --- | --- |
| Name and Principal Position | Year | Salary($) | Bonus($) | other Annual Compensation($) |
| Eric Schmidt Chairman of the Executive Committee and Chief Executive Officer | 2005 | 1 | 1,630 | 24,741 |
| | 2004 | 81,432 | 1,556 | 0 |

Figure 4:
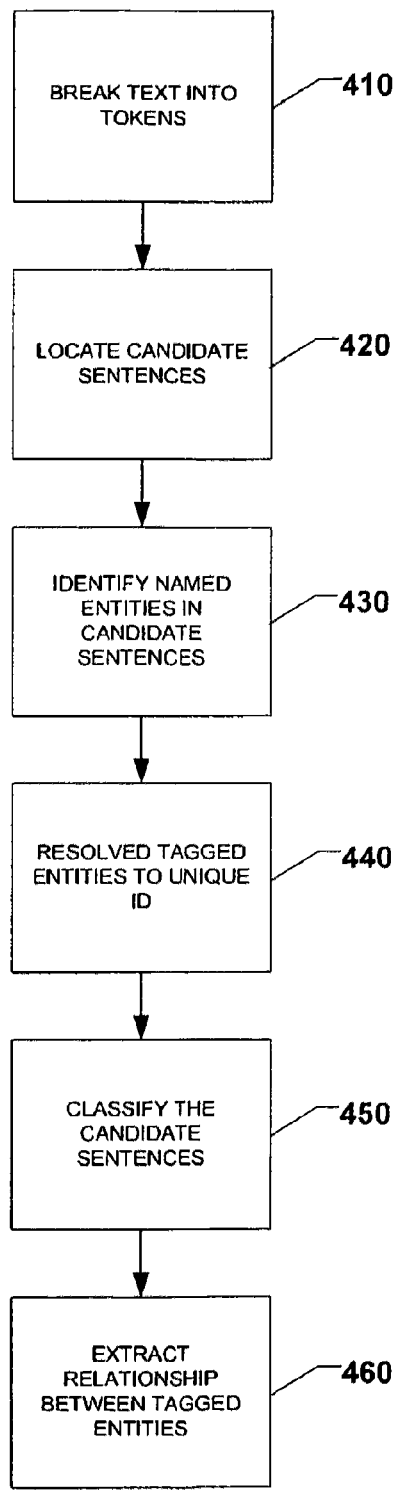
FIG. 4 is a flow chart of an exemplary method of named-entity tagging and resolution and event extraction corresponding to one or more embodiments of the present invention.

Exemplary Methods of Operating a Named-Entity Tagging, Resolution and Event and Relationship Extraction System FIG. 4 shows a flow chart 400 of an exemplary method of operating a named entity tagging, resolution, and event extraction system, such as system 300 in FIG. 3. Flow chart 300 includes blocks 410-460, which are arranged and described serially. However, other embodiments also provide different functional partitions or blocks to achieve analogous results.

Block 410 entails breaking the extracted text into tokens. Execution proceeds at block 220.

Block 420 entails locating parts of the extracted text that need to be processed. In the exemplary embodiment, this entails use of zoner 112 to locate candidate sentences for processing. Execution then advances to block 230.

Block 430 entails finding the named entities within the processed parts of extracted text. Then the entities of interest in the candidate sentences are tagged. Candidate sentences are sentences from target corpus that might contain a relationship of interest. For example, one embodiment identifies text segments that indicate job-change events; another identifies segments that indicate merger and acquisition activity; a yet another identifies segments that may indicate corporate income announcements. Execution continues at block 440.

Block 440 entails resolving the named entities. Each entity is attached to a unique ID that maps the entity to a unique real world object, such as an entry in an authority file. Execution then advances to block 250.

Block 250 classifies the candidate sentences. The candidate sentences are classified into two sets: those that contain the relationship of interest and those that do not. For example, one embodiment identifies text segments that indicate job-change events; another identifies segments that indicate merger and acquisition activity; a yet another identifies segments that may indicate corporate income announcements. When the text is classified, executes advances to block 260.

Block 260 entails extracting the relationship of interest using a template. More specifically, this entails extracting entities from text containing the relationship and place the entities in a relationship template that properly defines the relationship between the entities. When the template is completed, the extracted data may be stored in a database but it may also involve more complex operations such as representing the data according a time line or mapping it to an index.

Some embodiments of the present invention are implemented using a number of pipelines that add annotations to text documents, each component receiving the output of one or more prior components. These implementations use the Unstructured Information Management Architecture (UIMA) framework and ingest plain text and decomposes the text into components. Each component implements interfaces defined by the framework and provide self-describing metadata via XML descriptor files. The framework manages these components and the data flow between them. Components are written in Java or C++; the data that flows between components is designed for efficient mapping between these languages. UIMA additionally provides a subsystem that manages the exchange between different modules in the processing pipeline. The Common Analysis System (CAS) holds the representation of the structured information Text Analysis Engines (TAEs) add to the unstructured data. The TAEs receive results from other UIMA components and produce new results that are added to the CAS. At the end of the processing pipeline, all results stored in the CAS can be extracted from there by the invoking application (for example, database population) via a CAS consumer. Primitive TAEs (for example, tokenizer, sentence splitter) can be bundled into an aggregate TAE. Other embodiments use alternatives to the UIMA framework.

Figure 5:
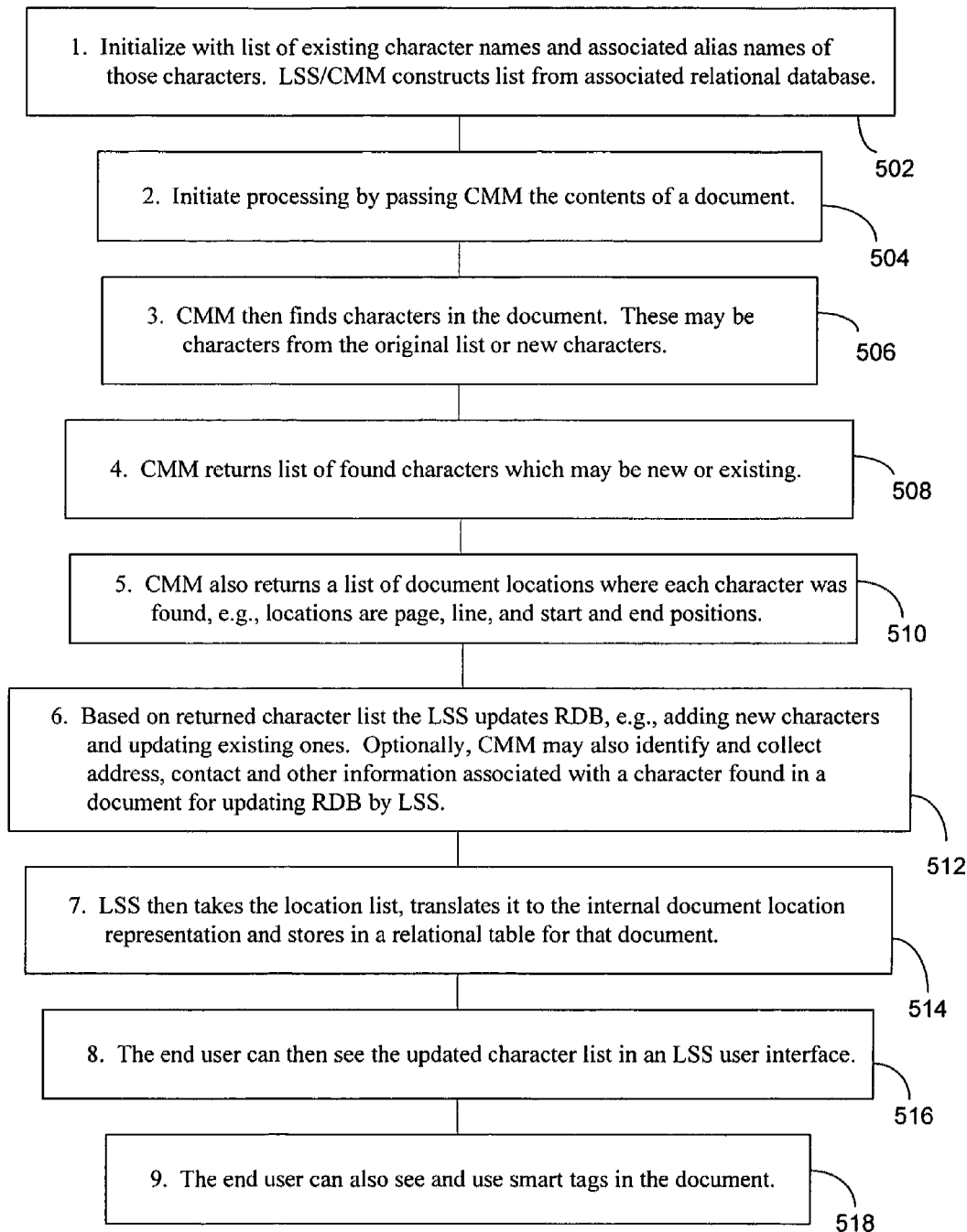
FIG. 5 is a flow chart of another exemplary method of named-entity tagging and resolution corresponding to one or more embodiments of the present invention.

With reference to FIG. 5, in another exemplary implementation the invention operates as follows. A character analysis and processing procedure 500 begins at step 502 with the LSS/EMM initialized with a set or list of existing character names and the associated alias names of those characters. The LSS will construct this list from its relational database (RDB). Next, at step 504, the system initiates processing by passing EMM the contents of a document. At step 506, EMM then finds characters in the document and generates a set of characters for passing to the LSS. These may be characters from the original list or new characters. At step 508, EMM returns to LSS a set or list of found characters which may be new or existing characters or aliases. At step 510, EMM also returns a set or list of document location information that represent locations or where in the document each character was found. For instance, the locations may comprise page, line, and start and end positions within the document. At step 512 LSS takes the returned character list or set and updates its relational database (RDB). This process may include adding new characters and updating existing ones. Also, existing characters may be updated with new aliases. Optionally, EMM may also identify and collect address, contact and other information associated with a character found in a document and return a set of such information to LSS. LSS may then update address, contact or other information associated with a character. At step 514 LSS then takes the location set or list, translates it to the internal document location representation and stores in a relational table for that document. At step 516, the end user can access for viewing and further action the updated character set or list in the LSS interface. At step 518, the end user can also access for viewing and further action smart tags in the document associated with characters involved in an event, e.g., a litigation.

More particularly, the Character Recognition Process performed by the EMM of the LSS system operates as follows. The LSS integrates with a component, EMM, to recognize "characters," e.g., persons, entities, company names, that appear within part or all of a document, e.g., within the text or body of a document. This process may be performed across a set of documents. For instance, in the legal context, decisions rendered in cases result in published opinions, orders or other documents that are of interest to legal professionals. LSS systems provide searching functions to enable users, such as attorneys, to search, identify and examine documents of interest. For instance, an attorney may be interested in reviewing decisions rendered by a certain court, judge or other entity. An LSS may maintain an existing relational DB of character or entity records associated with a collection of case law. The present invention may be used, for instance on a periodic basis as decisions are rendered and published, to update the RDB to further associate published decisions with existing characters, such as judges, attorneys, parties, etc. Upon detecting a "new" character, the present invention may be used to allow the LSS to create a new character record. The LSS, for instance, may be an integrated solution, such as West's LiveNote and Case Notebook solutions, and may include centralized components, such as web-servers and databases, and may involve localized applications that are downloaded and stored locally such as at a client computer or server. For instance, Case Notebook stores data in "Cases" and each case can contain many documents in various formats.

In one implementation of the present invention, the EMM provides an xml based messaging system for inter-process communication between EMM and LSS. LSS starts the EMM executable as desired or on a periodic scheduled basis or as when needed to process a set of documents to recognize characters and/or maintain the RDB. The LSS opens a named pipe to communicate with that process. Essentially, LSS sends xml, receives a response, then sends more xml, etc. The following is an exemplary EMM Communication Process:

(1) LSS starts a session with EMM.
(2) LSS sends EMM a set or list of characters. This character list or set is used for all content in the session. Characters have a name, and they can also have a list of aliases or nicknames, e.g., one alias for the name "David" is "Dave."

Pidgin XML:
```
<Characters>
<Character Name="John Smith" Metadata>
<Alias Name="John" />
<Alias Name="Mr. Smith" />
</Character>
<Character Name="Thomson Reuters" Metadata>
</Character>
</Characters>
```
Actual XML
```
<EMMInput>
    <Instruction Method="LoadCharacterList" />
    <AllCharacters>
        <AcceptedCharacters>
            <Character ID="1" Type="Individual">
                <Name Full="Copperfield David" Last="David"
                First="Copperfield">
                </Name>
                <Business Name="" Street1="" Street2="" Street3="" City=""
```

```
State="" Postal="" Country="" Email="" Phone="" Cell="" Fax=""/>
      <Home Street1="" Street2="" Street3="" City="" State=""
Postal="" Country="" Email="" Phone="" Cell=""/>
    </Character>
    <Character ID="2" Type="Individual">
      <Name Full="John Creakle" Last="Creakle" First="John">
        <Alias Name="Creakle"/>
      </Name>
      <Business Name="" Street1="" Street2="" Street3="" City=""
State="" Postal="" Country="" Email="" Phone="" Cell="" Fax=""/>
      <Home Street1="" Street2="" Street3="" City="" State=""
Postal="" Country="" Email="" Phone="" Cell=""/>
    </Character>
    <Character ID="3" Type="Individual">
      <Name Full="William Mell" Last="Mell" First="William">
        <Alias Name="Mell"/>
      </Name>
      <Business Name="" Street1="" Street2="" Street3="" City=""
State="" Postal="" Country="" Email="" Phone="" Cell="" Fax=""/>
      <Home Street1="" Street2="" Street3="" City="" State=""
Postal="" Country="" Email="" Phone="" Cell=""/>
    </Character>
    <Character ID="4" Type="Organization">
      <Name Full="Salem House" Last="" First="">
      </Name>
      <Business Name="Salem House" Street1="" Street2=""
Street3=""
City="" State="" Postal="" Country="" Email="" Phone="" Cell=""
Fax=""/>
      <Home Street1="" Street2="" Street3="" City="" State=""
Postal="" Country="" Email="" Phone="" Cell=""/>
    </Character>
  </AcceptedCharacters>
 </AllCharacters>
</EMMInput>
```

(3) LSS then sends a set of documents or content, e.g., each document or content may be sent one item at a time. A process translates the document's internal coordinate system into a coordinate system configured in the EMM. (For example, transcripts are stored with document locations specified by a page, a line and a position on that line. Word Processing files (RTF, Word, etc.) are stored with document locations specified by an offset position from the start of the file. Image locations are specified by a page along with a rectangle on that page (i.e., an x,y origin and a width and height). The EMM document location may be the same as the transcript document location.)

```
Pidgin XML:
<Document ID="0">
<Page Num="0">
<Line Num="0">
The Quick Brown Fox jumped
</Line>
<Line Num="1">
over John Smith.
</Line>
</Page>
</Document>
Actual XML
<EMMInput>
<Instruction Method="Annotate_Conservative" Args=""/>
<EMMMetadata>
<Document IsOCR="false" Type="Transcript">
</Document>
</EMMMetadata>
<InputFile>
   <Page Index="0">
      <Line Index="0">I HAD led this life about a month, when the man
with the wooden leg began to stump</Line>
      <Line Index="1">about</Line>
      <Line Index="2">with a mop and a bucket of water, from which I
inferred that preparations were making</Line>
      <Line Index="3">to</Line>
      <Line Index="4">receive Mr. Creakle and the boys. I was not
mistaken; for the mop came into the</Line>
      <Line Index="5">schoolroom</Line>
      <Line Index="6">before long, and turned out Mr. Mell and me, who
lived where we could, and got on how</Line>
      <Line Index="7">we</Line>
      <Line Index="8">could, for some days, during which we were
always in the way of two or three young</Line>
      <Line Index="9">women,</Line>
      <Line Index="10">who had rarely shown themselves before, and
were so continually in the midst of dust</Line>
      <Line Index="11">that</Line>
      <Line Index="12">I sneezed almost as much as if Salem House had
been a great snuff-box.</Line>
      <Line Index="13">One day I was informed by Mr. Mell that Mr.
Creakle would be home that evening. In the</Line>
      <Line Index="14">evening, after tea, I heard that he was come.
Before bedtime, I was fetched by the man</Line>
      <Line Index="15">with the wooden leg to appear before
him.</Line>
      <Line Index="16">Mr. Creakle's part of the house was
a good deal more comfortable than ours, and he had</Line>
      <Line Index="17">a snug bit of garden that looked pleasant after
the dusty playground, which was such a</Line>
      <Line Index="18">desert in miniature, that I thought no one but a
camel, or a dromedary, could have felt</Line>
      <Line Index="19">at home in it. It seemed to me a bold thing even
to take notice that the passage</Line>
      <Line Index="20">looked comfortable, as I went on my way,
trembling, to Mr. Creakle's presence: which</Line>
      <Line Index="21">so abashed me, when I was ushered into it, that I
hardly saw Mrs. Creakle or Miss</Line>
      <Line Index="22">Creakle (who were both there, in the parlour), or
anything but Mr. Creakle, a stout</Line>
      <Line Index="23">gentleman with a bunch of watch-chain and seals,
in an arm-chair, with a tumbler and</Line>
      <Line Index="24">bottle beside him.</Line>
      <Line Index="25"></Line>
      <Line Index="26">'So!' said Mr. Creakle.
'This is the young gentleman whose teeth are to be
filed!</Line>
      <Line Index="27">Turn him round.'</Line>
      <Line Index="28">The wooden-legged man turned me about so as
to exhibit the placard; and having afforded</Line>
      <Line Index="29">time for a full survey of it, turned me about
again, with my face to Mr. Creakle, and</Line>
      <Line Index="30">posted himself at Mr. Creakle's side.
Mr. Creakle's face was fiery, and his eyes were</Line>
      <Line Index="31">small, and deep in his head; he had thick veins
in his forehead, a little nose, and a</Line>
      <Line Index="32">large chin. He was bald on the top of his head;
and had some thin wet-looking hair that</Line>
      <Line Index="33"></Line>
      <Line Index="34">was just turning grey, brushed across each
temple, so that the two sides interlaced on</Line>
      <Line Index="35">his forehead. But the circumstance about him
which impressed me most, was, that he had</Line>
      <Line Index="36">no voice, but spoke in a whisper. The exertion
this cost him, or the consciousness of</Line>
      <Line Index="37">talking in that feeble way, made his angry face
so much more angry, and his thick veins</Line>
      <Line Index="38">so much thicker, when he spoke, that I am not
surprised, on looking back, at this</Line>
      <Line Index="39">peculiarity striking me as his chief one.
'Now, ' said Mr. Creakle. '
What's the report</Line>
      <Line Index="40">of this boy?'</Line>
      <Line Index="41">'There's nothing against
him yet, ' returned the man with the wooden leg. '
There has</Line>
      <Line Index="42">been</Line>
      <Line Index="43">no opportunity.'</Line>
      <Line Index="44">I thought Mr. Creakle was disappointed. I
thought Mrs. and Miss Creakle (at whom I now</Line>
      <Line Index="45">glanced for the first time, and who were, both,
```

```xml
thin and quiet) were not disappointed.</Line>
    <Line Index="46"></Line>
    <Line Index="47">'Come here, sir!'
said Mr. Creakle,
beckoning to me.</Line>
    <Line Index="48"></Line>
    <Line Index="49">'Come here!' said the
man with the wooden leg, repeating the gesture.</Line>
    <Line Index="50"></Line>
    <Line Index="51">'I have the happiness of knowing your
father-in-law, ' whispered Mr. Creakle, taking me</Line>
    <Line Index="52">by the ear; 'and a worthy man he is,
and a man of a strong character. He knows me, and</Line>
    <Line Index="53">I know him. Do YOU know me?
Hey?' said Mr. Creakle, pinching my ear with
ferocious</Line>
    <Line Index="54">playfulness.</Line>
  </Page>
</InputFile>
</EMMInput>
```

(4) EMM then processes the document to identify characters. The EMM may idetnify characters both from the existing list (derived from the LSS RDB), and it may also identify new characters that do not correspond to any character records maintained by the LSS. EMM sends to the LSS a set or list of new characters, along with a set or list of location information representing where in the document each character can be found. LSS then merges the returned character list with the cases character set maintained at the RDB—this may also be referred to as an authority DB. Optionally, the EMM may simply return to the LSS a complete list of characters identified in the set of documents and the functionality of determining duplication within the returned character set vis-à-vis the existing or authority character set.

```xml
Pidgin XML:
<Characters>
<Character Name="John Smith" Metadata>
<Alias Name="John" />
<Alias Name="Mr. Smith" />
<AliasLocation Page="0" Line="1" Position="5">
</Character>
<Character Name="Thomson Reuters" Metadata>
</Character>
<Character Name="Quick Brown Fox" Metadata>
</Character>
</Characters>
Actual XML
<EMMOutput>
<Error Code="0" Description=""/>
<FoundCharacters>
<OtherCharacters>
</OtherCharacters>
<AcceptedCharacters>
<Character ID="3"
  Type="Individual" >
<Name Full="William Mell" Last="Mell" First="William">
<Alias Name="Mell"/>
</Name>
<Business Name="" Street1="" Street2="" Street3="" City="" State=""
Postal="" Country="" Email="" Phone="" Cell="" Fax=""/>
<Home Street1="" Street2="" Street3="" City="" State="" Postal=""
Country="" Email="" Phone="" Cell=""/>
</Character>
<Character ID="2"
  Type="Individual" >
<Name Full="John Creakle" Last="Creakle" First="John">
<Alias Name="Creakle"/>
</Name>
<Business Name="" Street1="" Street2="" Street3="" City="" State=""
Postal="" Country="" Email="" Phone="" Cell="" Fax=""/>
<Home Street1="" Street2="" Street3="" City="" State="" Postal=""
Country="" Email="" Phone="" Cell=""/>
</Character>
</AcceptedCharacters>
</FoundCharacters>
<FoundLinks>
<Link CharacterID="2" BeginPage="0" BeginLine="4" BegPos="12"
EndPage="0" EndLine="4" EndPos="19" Confidence="Creakle"
Status="RESOLVED"/>
<Link CharacterID="3" BeginPage="0" BeginLine="6" BegPos="32"
EndPage="0" EndLine="6" EndPos="36" Confidence="Mell"
Status="RESOLVED"/>
<Link CharacterID="4" BeginPage="0" BeginLine="12" BegPos="31"
EndPage="0" EndLine="12" EndPos="42" Confidence="Salem House"
Status="RESOLVED"/>
<Link CharacterID="3" BeginPage="0" BeginLine="13" BegPos="30"
EndPage="0" EndLine="13" EndPos="34" Confidence="Mell"
Status="RESOLVED"/>
<Link CharacterID="2" BeginPage="0" BeginLine="13" BegPos="44"
EndPage="0" EndLine="13" EndPos="51" Confidence="Creakle"
Status="RESOLVED"/>
<Link CharacterID="2" BeginPage="0" BeginLine="16" BegPos="4"
EndPage="0" EndLine="16" EndPos="11" Confidence="Creakle"
Status="RESOLVED"/>
<Link CharacterID="2" BeginPage="0" BeginLine="20" BegPos="59"
EndPage="0" EndLine="20" EndPos="66" Confidence="Creakle"
Status="RESOLVED"/>
<Link CharacterID="2" BeginPage="0" BeginLine="21" BegPos="66"
EndPage="0" EndLine="21" EndPos="73" Confidence="Creakle"
Status="RESOLVED"/>
<Link CharacterID="2" BeginPage="0" BeginLine="22" BegPos="0"
EndPage="0" EndLine="22" EndPos="7" Confidence="Creakle"
Status="RESOLVED"/>
<Link CharacterID="2" BeginPage="0" BeginLine="22" BegPos="67"
EndPage="0" EndLine="22" EndPos="74" Confidence="Creakle"
Status="RESOLVED"/>
<Link CharacterID="2" BeginPage="0" BeginLine="26" BegPos="15"
EndPage="0" EndLine="26" EndPos="22" Confidence="Creakle"
Status="RESOLVED"/>
<Link CharacterID="2" BeginPage="0" BeginLine="29" BegPos="73"
EndPage="0" EndLine="29" EndPos="80" Confidence="Creakle"
Status="RESOLVED"/>
<Link CharacterID="2" BeginPage="0" BeginLine="30" BegPos="22"
EndPage="0" EndLine="30" EndPos="29" Confidence="Creakle"
Status="RESOLVED"/>
<Link CharacterID="2" BeginPage="0" BeginLine="30" BegPos="42"
EndPage="0" EndLine="30" EndPos="49" Confidence="Creakle"
Status="RESOLVED"/>
<Link CharacterID="2" BeginPage="0" BeginLine="39" BegPos="58"
EndPage="0" EndLine="39" EndPos="65" Confidence="Creakle"
Status="RESOLVED"/>
<Link CharacterID="2" BeginPage="0" BeginLine="44" BegPos="14"
EndPage="0" EndLine="44" EndPos="21" Confidence="Creakle"
Status="RESOLVED"/>
<Link CharacterID="2" BeginPage="0" BeginLine="44" BegPos="64"
EndPage="0" EndLine="44" EndPos="71" Confidence="Creakle"
Status="RESOLVED"/>
<Link CharacterID="2" BeginPage="0" BeginLine="47" BegPos="27"
EndPage="0" EndLine="47" EndPos="34" Confidence="Creakle"
Status="RESOLVED"/>
<Link CharacterID="2" BeginPage="0" BeginLine="51" BegPos="68"
EndPage="0" EndLine="51" EndPos="75" Confidence="Creakle"
Status="RESOLVED"/>
<Link CharacterID="2" BeginPage="0" BeginLine="53" BegPos="43"
EndPage="0" EndLine="53" EndPos="50" Confidence="Creakle"
Status="RESOLVED"/>
</FoundLinks>
</EMMOutput>
```

(5) LSS repeats steps (3) and (4) until it has no more documents to scan. It then shuts down the EMM process.

The LSS may also include code to transform LSS-related content coordinate systems into the EMM coordinate system. For instance, where the LSS integrates or functions in conjunction with other applications, e.g., Microsoft Word, Corel WordPerfect, then a module may be provided to transform Word Processing coordinates into EMM coordinates. Word Processing files have coordinates that are stored as a single number, which is a character offset from the beginning of the file. These are transformed into EMM coordinates by "walking down" the document. Every 75 characters the process walks forward to the end of a word. For each such instance the process recognizes this 75+ character string as a line. For every 25 lines, the process adds those lines to a page. Note that in the context of translating coordinates the reference to "character" is not to an entity or name, as used elsewhere in this specification, but rather to individual discrete, base units of linguistic expression. For example, the single "character" "David" comprises five characters.

The LSS may also include code to transform LSS-related Image coordinates into EMM coordinates. Images have words located in rectangles on pages. To transform these rectangles into lines, the LSS leverages the fact that its OCR engine lists words in the traditional English order (i.e., it starts from the top left, moves right, and then back to the left when the line is ended). Accordingly, the process runs down the list of rectangles. If the y coordinates of the word do not overlap with the previous word (which would indicate a move to the next line), or if the x coordinates are less than the previous rectangle (which would indicate a carriage return equivalent), then the process starts a new line.

Figure 6:
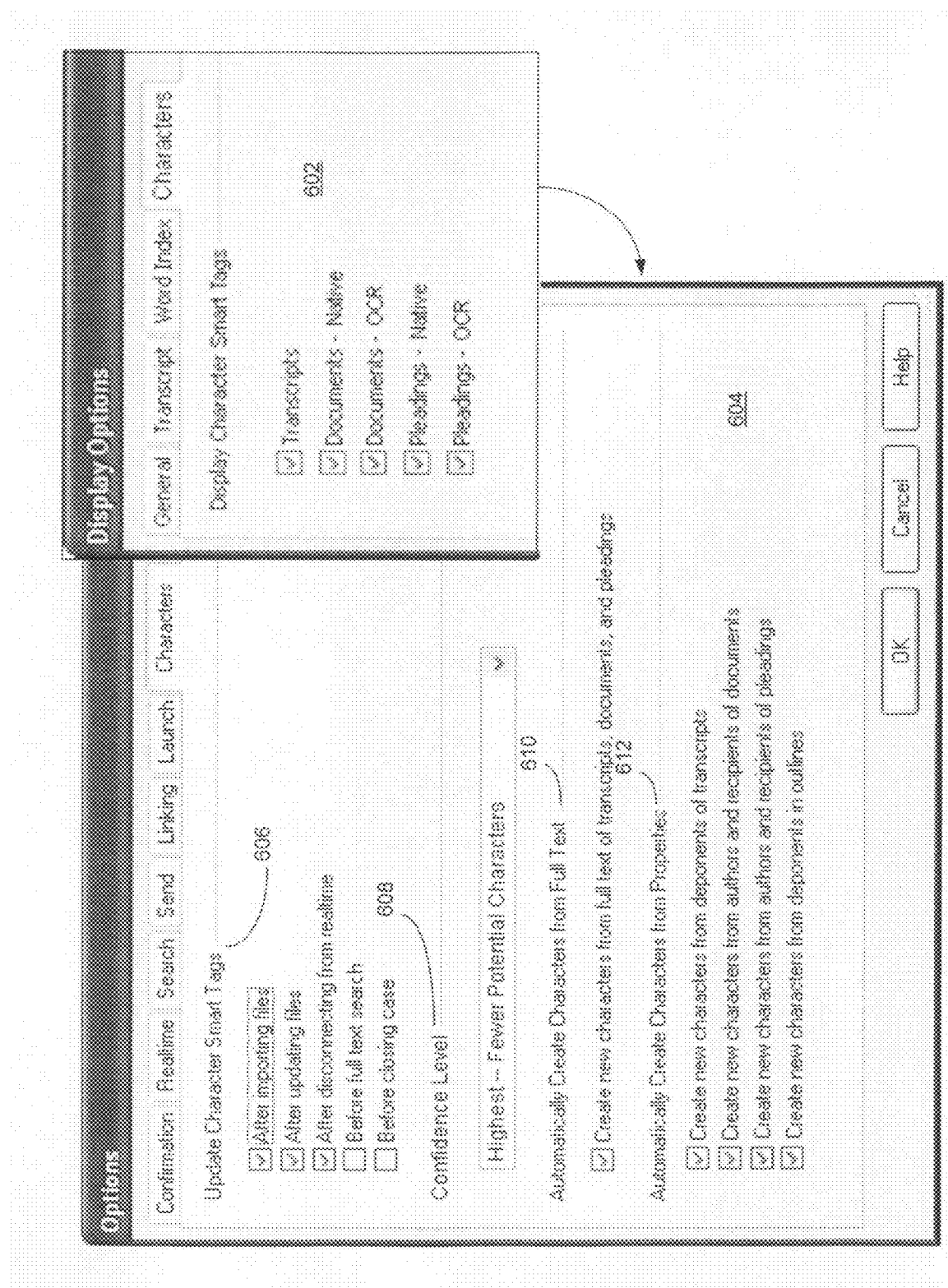

With reference to FIG. 6, the system allows the user to modify the Options which control the following operations via user interfaces 602 and 604. "Update Character Smart Tags" 606 controls smart tagging names of persons and companies in the data. Assigning a "confidence" level to control how precise the Entity Tagger behaves in determining whether a word is a name is controlled via "Confidence level" 608. "Automatically Creates Characters from Full Text" 610 controls whether names of persons and organizations are automatically added to the user-displayed Characters table when the Entity Tagger tags them in the FULL TEXT data imported and stored in the LSS, for example in West Case Notebook. "Automatically Creates Characters from Properties" 612 controls whether names of persons and organizations are automatically added to the user-displayed Characters table when the user manually enters the name into a specific metadata property, e.g. Deponent Name. If the box is selected or "checked" then the EMM automatically adds any new entities or names identified when running the EMM on the selected document.

The user may optionally de-select the checkbox appearing beneath the heading "Automatically Creates Characters from Full Text." When de-selected, the EMM does not automatically display new names in the Characters table when the Character Recognition software tags words in the full text of data imported into the system. The EMM software still tag names, however they will be stored in a side table, for example, for the user to analyze at a later time, and potentially add them to the main Characters table. This may be a default setting.

Figure 7:
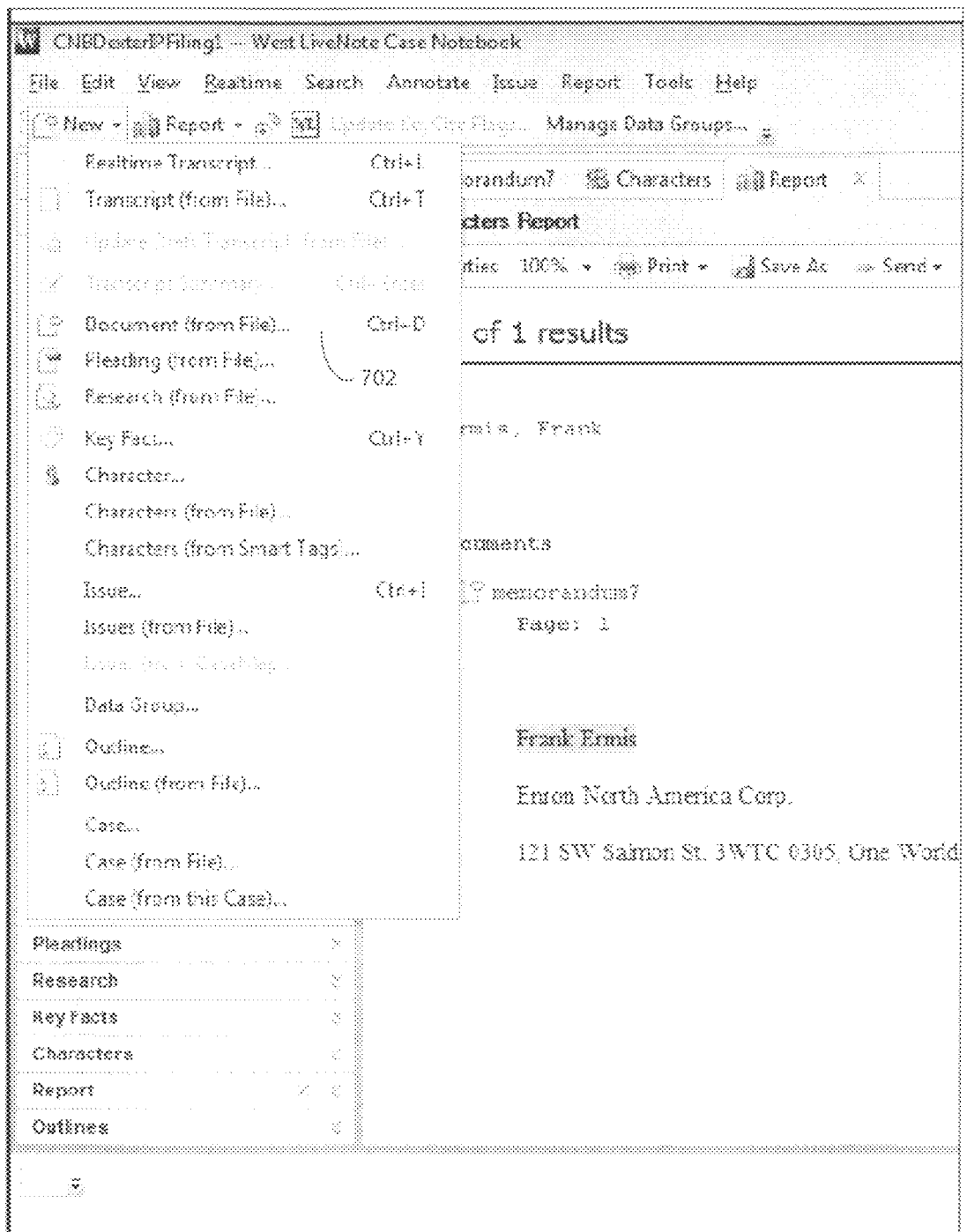

In the exemplary manner of operation illustrated, and with reference to FIG. 7, the user clicks the Import New Document button and selects "Document (from File)" 702. The user navigates to the location of the document(s) (see the Open dialog box at FIG. 14) which they wish to import. The selected document, e.g., memorandum13.doc, is imported into the LSS and the EMM Character Recognition process runs on the words indexed from the target document. After the EMM Character Recognition process is completed, the user does not see some of the entity names of persons and organizations "smart-tagged" in the data, unless the user has already manually entered that name into the LSS.

Figure 9:
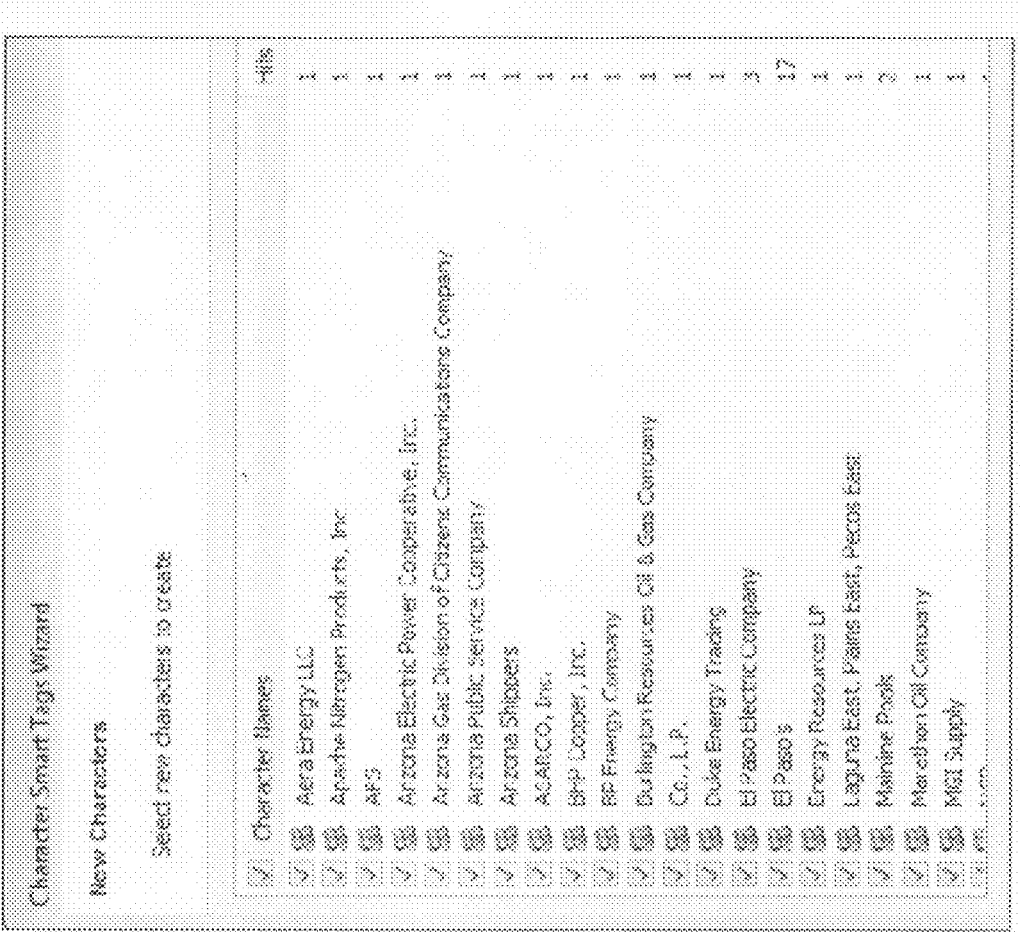
Figure 8:
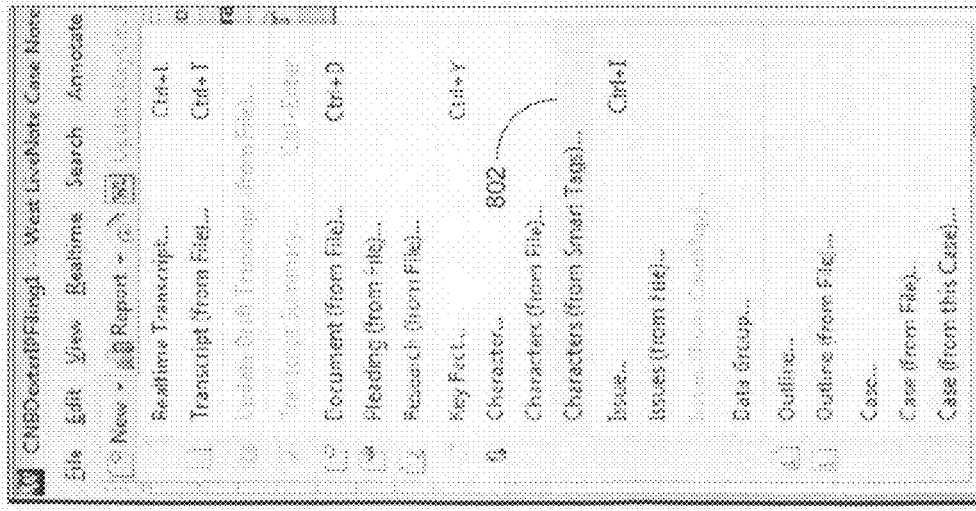
Figure 10:
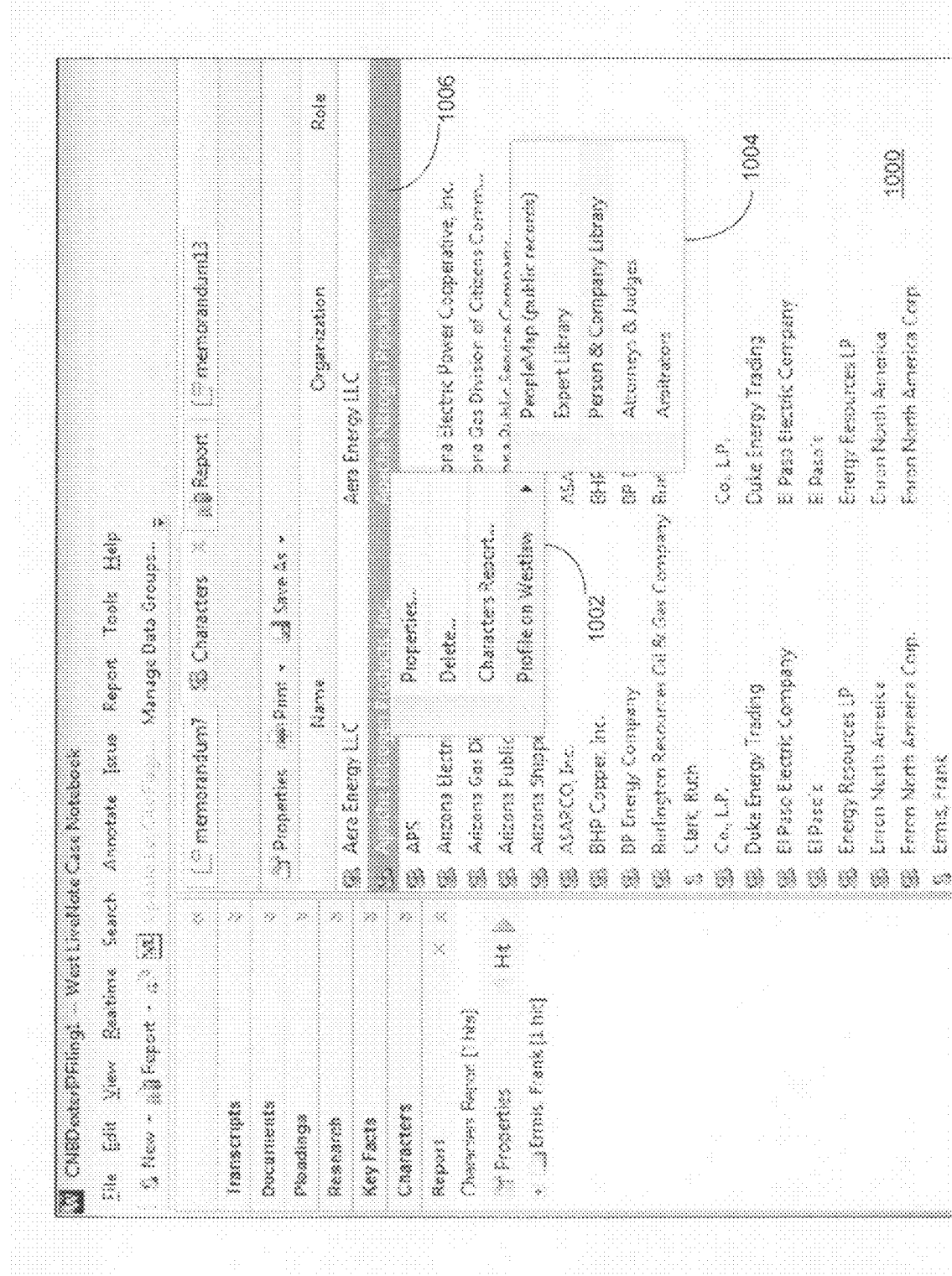

With reference to FIGS. 8-10, the user selects from the "New" tab drop-down the "Characters (from Smart Tags)" 802 option. This option displays the side table referenced above, FIG. 9, and allows the user to analyze the names the EMM has tagged and to choose which entities/names to add to the user-displayed Characters table of FIG. 10. The side table, FIG. 9, allows the user to analyze the names tagged by the EMM process and to choose which to add to the user-displayed Characters table. In the example illustrated in FIG. 9, the user has selected all entity names to be added, which may be a default. Accordingly, when next viewing the Character list or table 1000, as illustrated in FIG. 10, all of the "new" entities found by the EMM are included in the master entity list or table. This main user-display Characters table 1000 now displays all of the characters or entities previously loaded onto the list as well as the new entities from the subsequently run EMM process on the selected document—memorandum13.doc. The user will now see the "Smart Tag" link markup in the full text data stored within the LSS. In addition, and optionally, the options box 1002 allows the user to run, for example, a Characters report for the new entities and Profile the new entities on a separate part of the LSS or using an outside or separate professional services system, e.g., Westlaw. The LSS may include a "onePass" type user authorization feature that permits seamless integration and flow to some or all of additional research or other tools and systems. A user may also be presented with a typical "login" screen to access the outside or separate service or tool.

Figure 11:
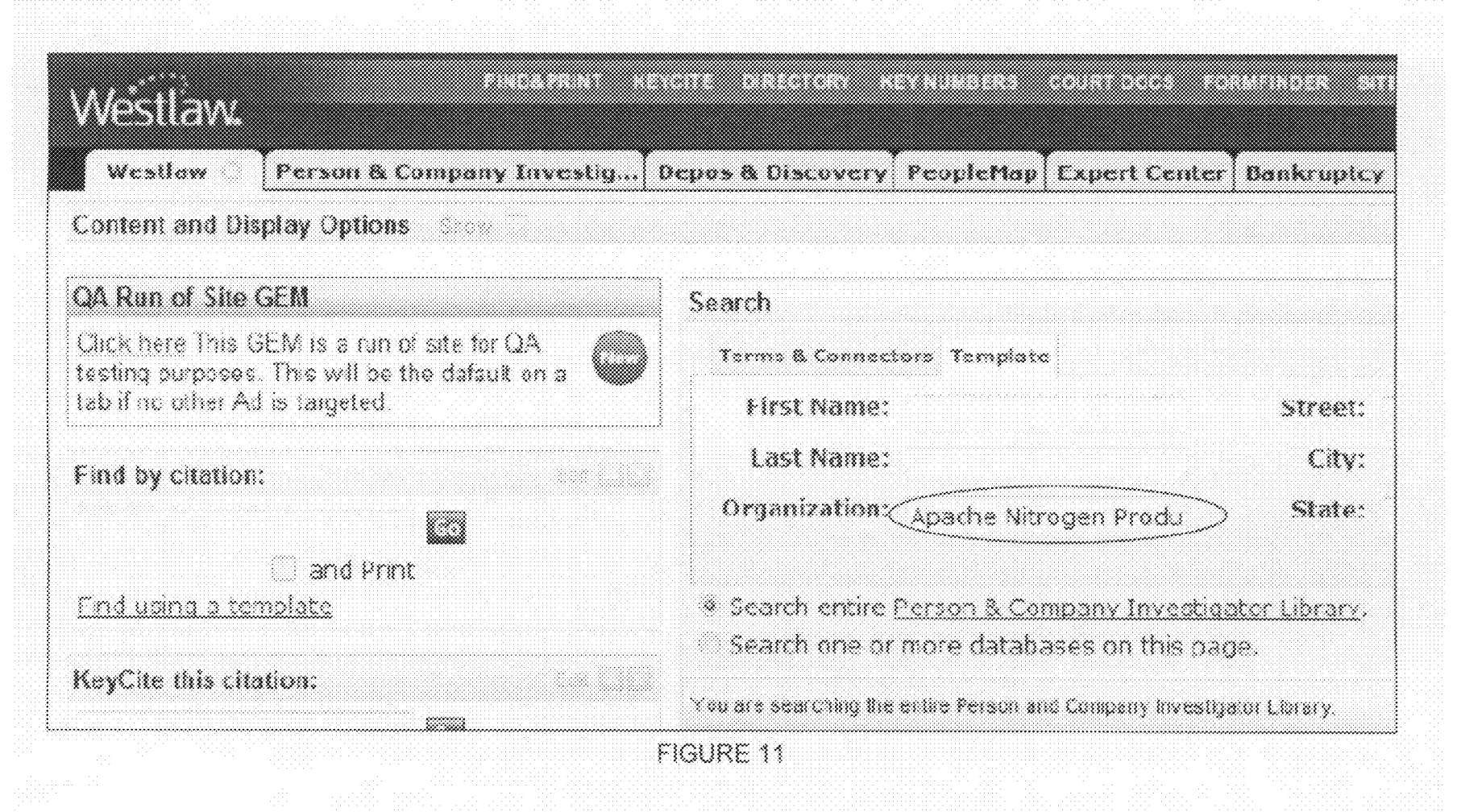
Figure 12:
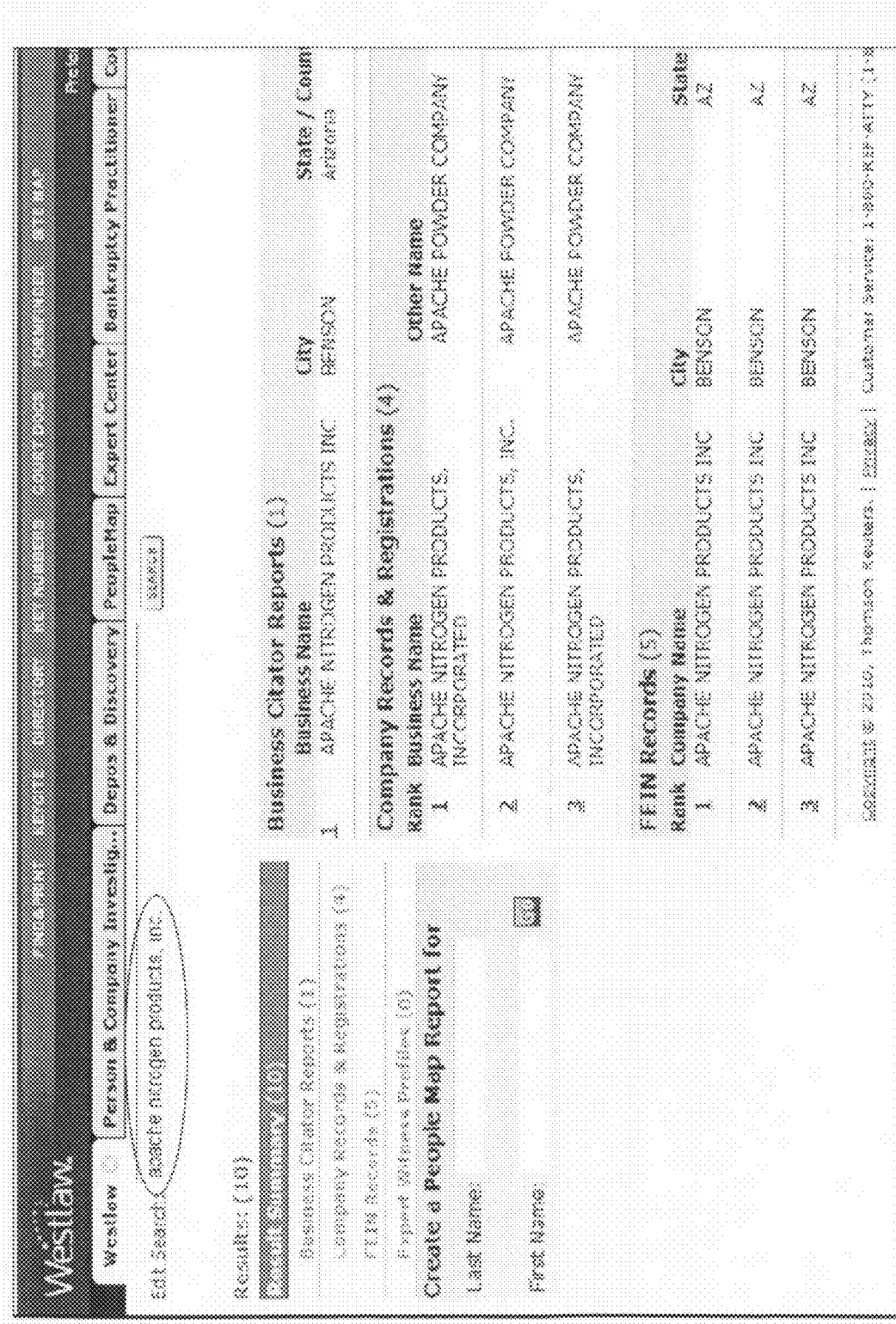

For instance, the user may select the entity "Apache Nitrogen Products, Inc." 1006 and select "Profile on Westlaw" to display a further option box 1004 from which the user may select "Person & Company Library" feature. FIG. 11 shows a screen, following any required login process, for performing this added service of a search for the selected entity using the selected resource. FIG. 12 illustrates a series of reports resulting from the additional search. These search results may also be brought into the LSS system for use in performing professional services. For example, the results may include documents relating to a case and/or entity of interest to the user and may be incorporated into a documents database, may be processed for smart tagging, may be excerpted for deposition outline, etc. The processes described above may now be performed on any imported document from the outside or added service.

Figure 13:
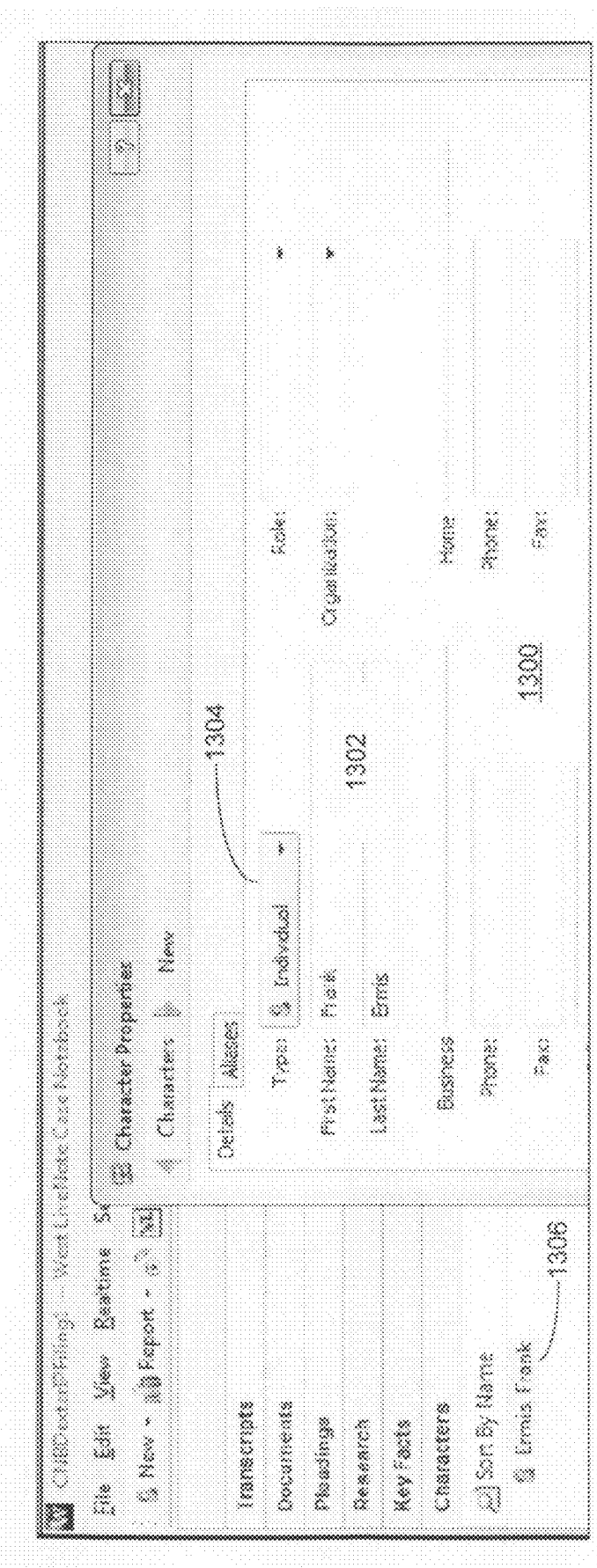

With reference to the example of FIG. 13, the user clicks the New Character button and is presented with a dialog 1300 within which the user can manually create a new Character "Frank Ermis"1302. The user clicks OK and the name Frank Ermis is added to the user-displayed Characters table, as also reflected in the "Characters" drop down 1306.

Figure 14:
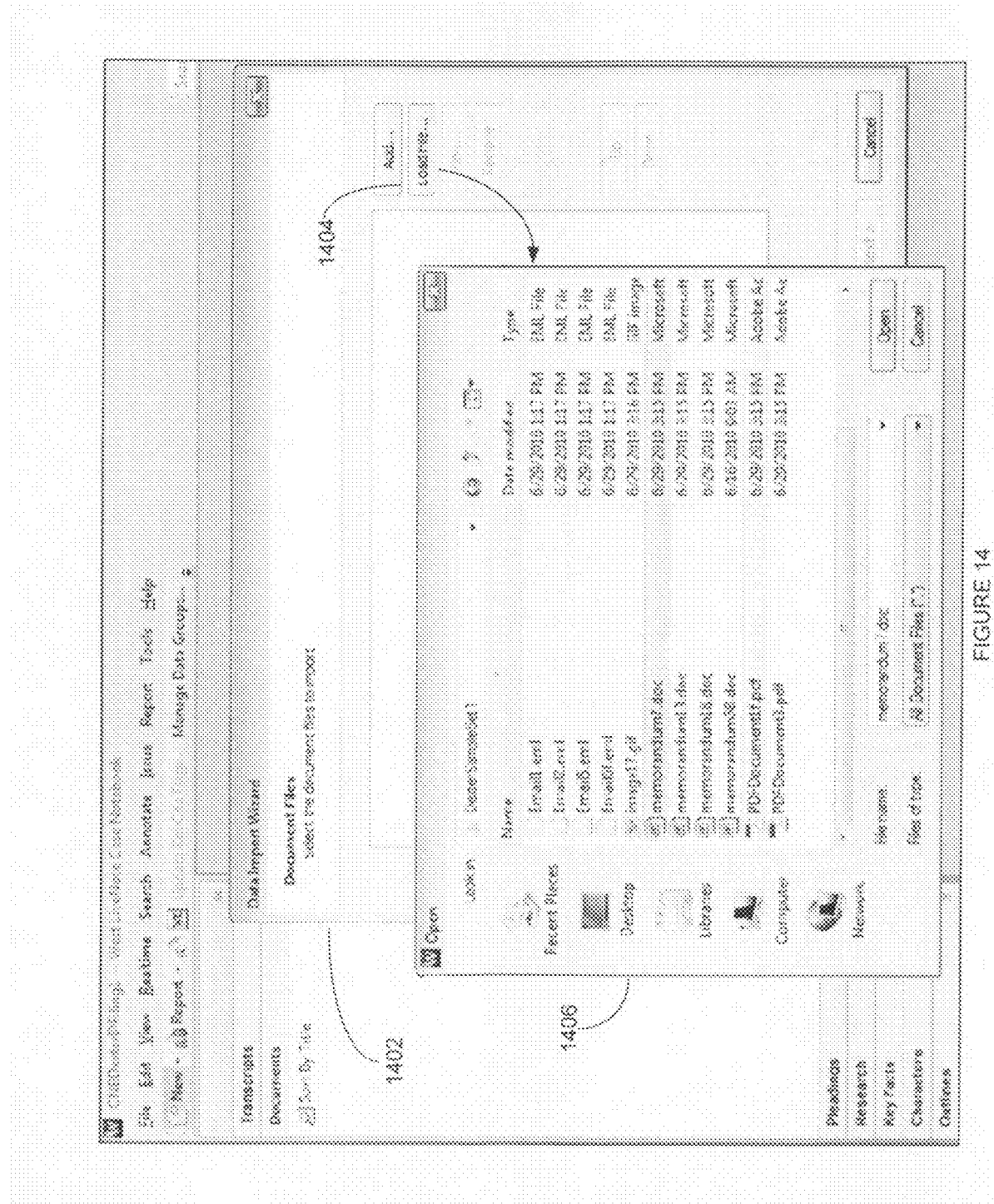
Figure 15:
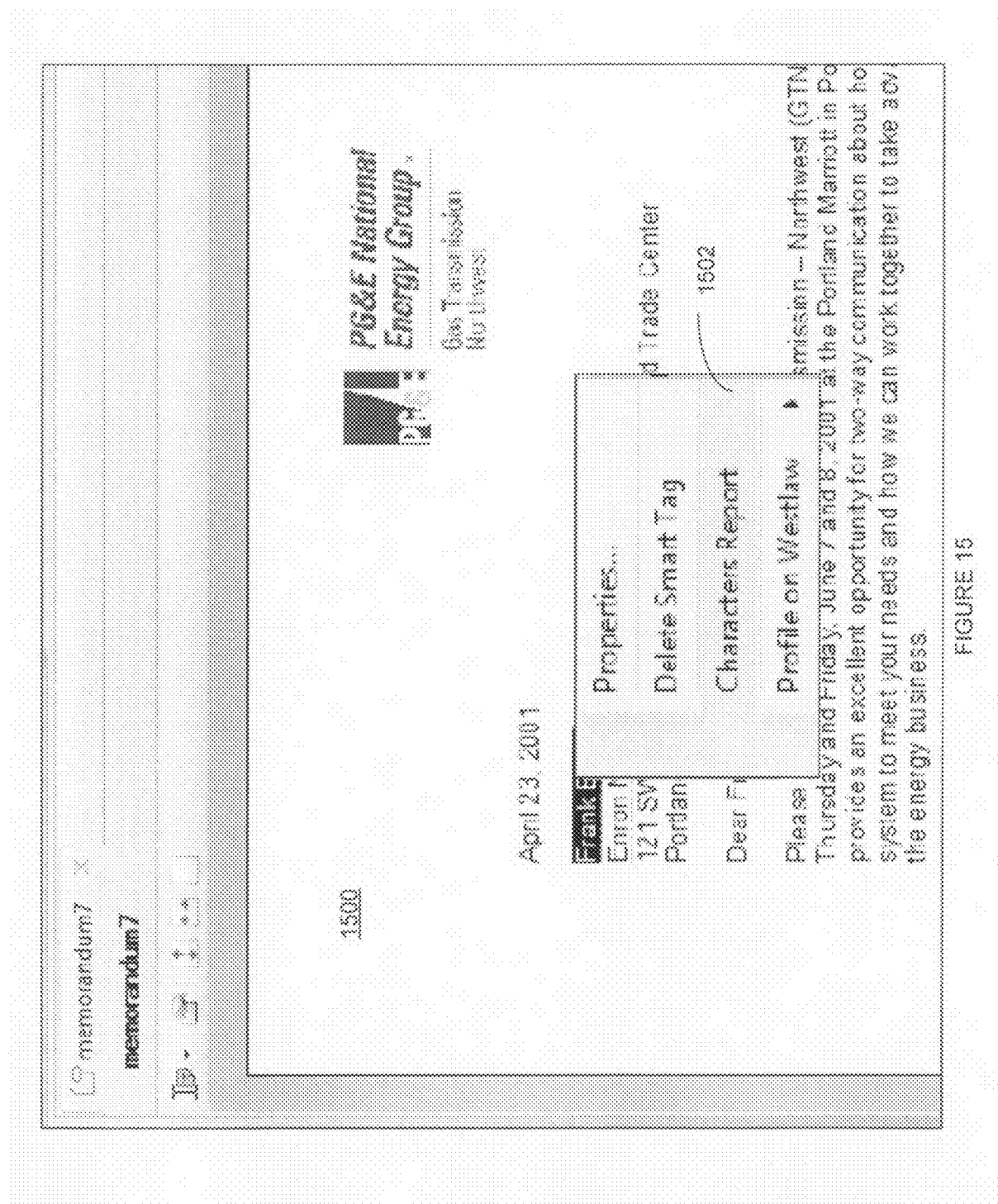
Figure 16:
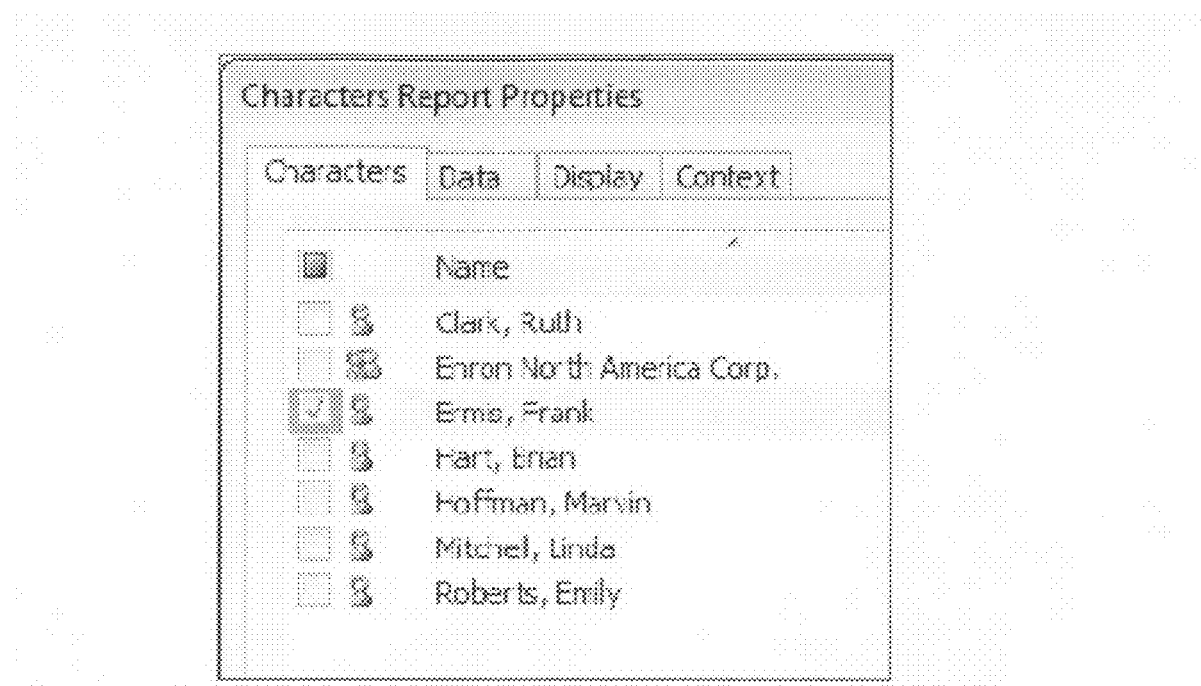

With reference to FIG. 14, the user clicks the import New Document button and the Data Import Wizard dialog appears. The user navigates, such as by clicking on the "Load File" button or by right-clicking the mouse, to launch a dialog box 1406 for navigating to the location of the document(s) which they wish to import. In this example, the user has selected document "memorandum7.doc." These are merely exemplary of the many ways the LSS may be configured to allow a user to access documents for performing the EMM Character Recognition and smart tagging operation of the present invention and is not limiting as to the scope of the invention.

The document 1500 (memorandum7.doc) is then imported into the LSS, e.g., West Case Notebook, and the EMM Character Recognition process runs on the words indexed from the target document.

In this example, the name Frank Ermis was found in the full text of this document, and was "Smart Tagged." The user now has right-click options associated with this Smart Tagged name as described above in regards to FIGS. 10-12. In addition, because the Options were set to automatically display new names in the user-displayed Characters table when the EMM Character Recognition software tags identified entities, new Characters were added to the table automatically.

Figure 17:
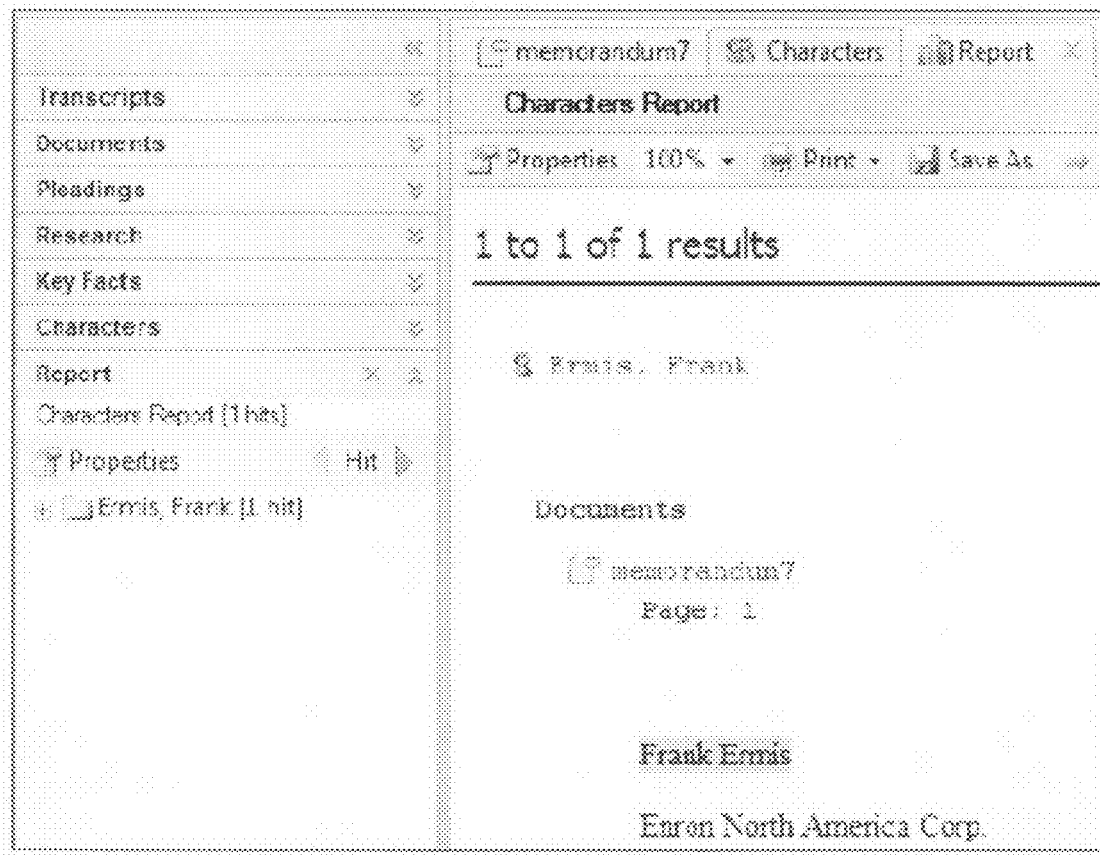

The user also has right-click options associated with this Smart Tagged name, appearing in the Characters table. In this example, the user chooses the Characters Report 1502 right-click option for Frank Ermis. As shown in FIG. 17, the Characters Report runs and returns the reference to Frank Ermis's name in the full text of the document currently stored in the LSS. The user may then click the link to the document titled "memorandum7" to view the full document referencing the name Frank Ermis. The LSS retrieves the full document referencing the name Frank Ermis, highlighting the reference. This is useful when the user wants to quickly see the thousands of references to a Character of the litigation appearing across potentially thousands of documents stored in the LSS.

Figure 18:
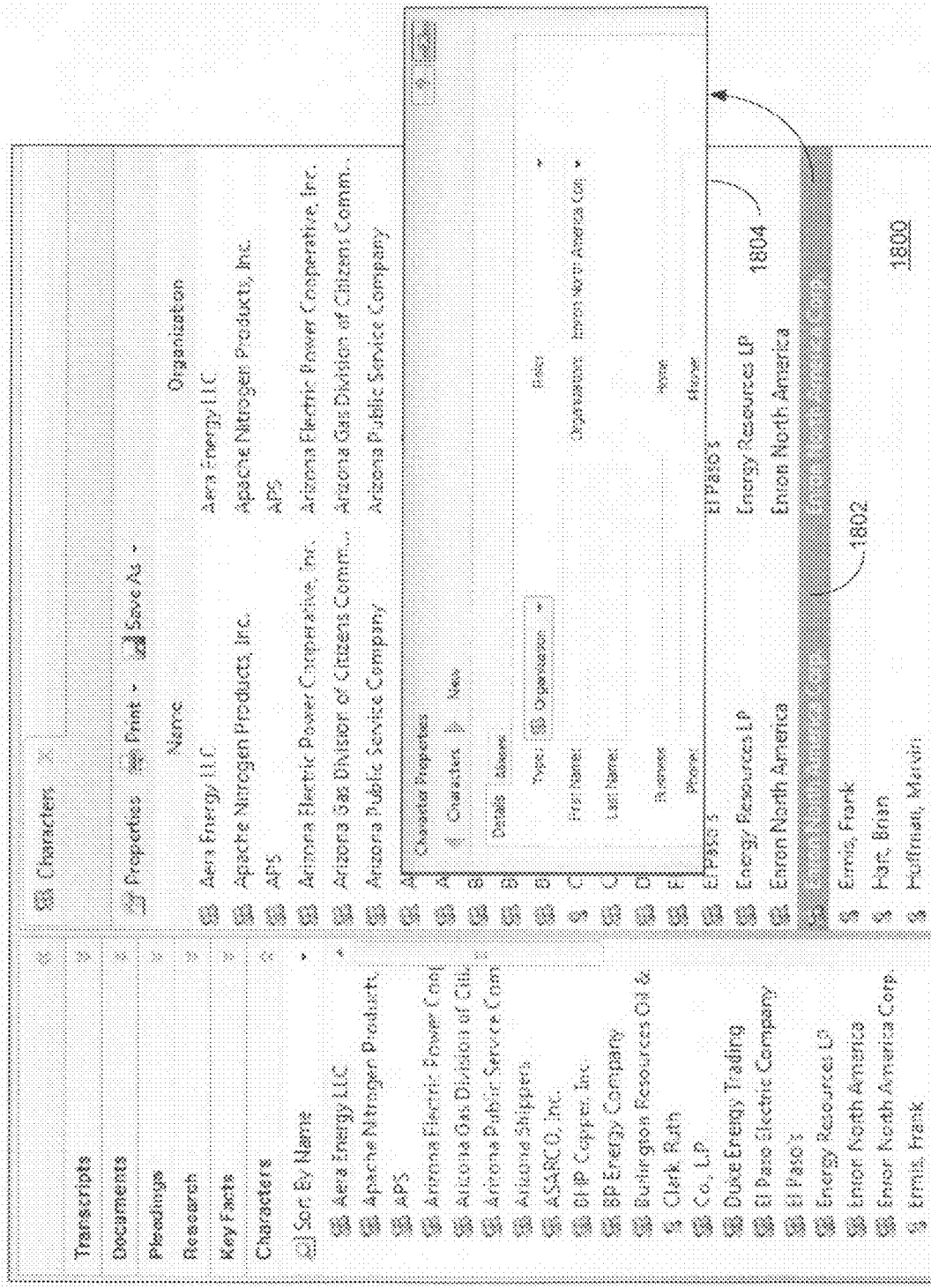
Figure 19:
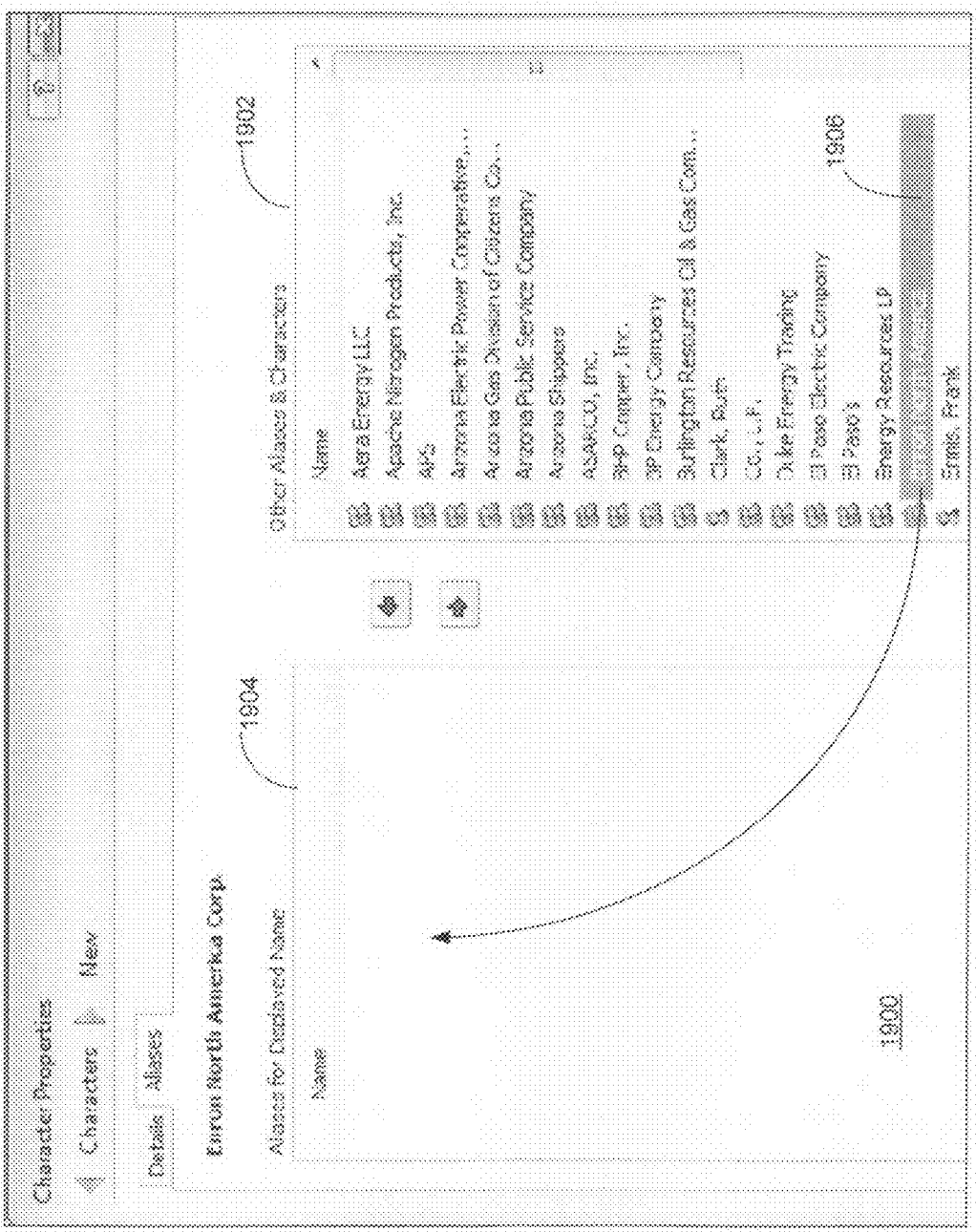

With reference to FIGS. 18-19, the user double-clicks the entity listing "Enron North America Corp." 1802 to view the Properties dialog 1804 of the user-displayed Characters table 1800. The "Details" tab of the dialog 1804 is presented, but the user may click on the "Aliases" tab to add alias information for the "Enron North America Corp" entity. Upon selecting the Aliases tab, the user is presented with the Aliases screen 1900, including the "Other Aliases & Characters" table 1902 on the right side of the dialog box. This table or list 1902 displays a list of entities displayed in the Characters table, as well as the entities tagged in the data by the EMM Character Recognition software.

The user can use this list to verify that variations of an entity name are properly associated to the name displayed in the Characters table. In this example, the user has selected "Enron North America" from the list on the right side, with the intent to add it to the list on the left side 1904 and thus become a variation of the name. Doing this means the Characters report will return results for "Enron North America" in addition to the main listed variation "Enron North America, Corp."

APPENDIX

Exemplary Extraction of Information from Tables Found in Text

For the exemplary embodiment, we downloaded hundreds of documents from Edgar database (EDGAR) and annotated 150 of them for training and evaluation. We converted the documents into XI-ITML using Tidy (Raggett) before annotating them.

TABLE 3

A compensation table

| | | Annual Compensation | | | Long-Term | |
|---|---|---|---|---|---|---|
| Name and Principal Position | Fiscal Year | Salary(S) | Bonus(S)(1) | Other Annual Compensation (S) | Compensation Awards Options (#) | All Other Compensation (S)(2) |
| John T. Chambers | 2005 | 350,000 | 1,300,000 | 0 | 1,500,000 | 8,977 |
| President, Chief Executive | 2004 | 1 | 1,900,000 | 0 | 0 | 0 |
| Officer and Director | 2003 | 1 | 0 | 0 | 4,000,000 | 0 |
| Mario Mazzola | 2005 | 447,120 | 557,737 | 0 | 600,000 | 7,424 |
| Former Senior Vice President, | 2004 | 464,317 | 666,850 | 0 | 600,000 | 5,726 |
| Chief Development Officer (3) | 2003 | 447,120 | 764,897 | 0 | 500,000 | 2,905 |
| Charles H. Giancarlo | | | | | | |
| . . . | | | | | | |

Our information extraction system for genuine tables involve the following:

1. table classification
2. label row and column classification
3. table structure recognition
4. table understanding Step 1, which is implemented to maintain efficiency, entails identifying tables that have a reasonable chance of containing the desired relation before deep analysis are applied. The tables containing the desired information are quickly identified using relation-specific classifiers based on supervised machine learning. In Step 2, we distinguish between label column and label rows from values inside those tables. This time, the same supervised machine learning approach is used, but the training data is different from those in Step 1. In Step 3, after those label rows and label column are identified, an elaborate procedure is applied to these complex tables to ensure that semantically coherent labels are not separated into multiple cells, or multiple distinct labels are not squashed into a cell. The goal here is to associate each value with their labels in the same column and the same row. The result of the Step 3 is a list of attribute-value pairs. In Step 4, a rule-based inference module goes through each attribute-value pairs and identify the desirable ones to populate the officers and directors database.

Before providing the details of those steps, we will first describe the annotation for performing the supervised learning employed in both Step 1 and Step 2.

Annotation Requirements: In the early stage of the project, we originally categorized tables containing desired information based on the overall information conveyed in each table, such as "officer compensation" or "director committee assignment". We annotate tables with the desired relations directly. In SEC filings, the relation "name+title" might appear in various categories of tables, which makes the original table categories ineffective. In addition, there are too many variations of tables in this domain which makes defining an effective closed set of categories difficult. For example, Table 3 is a compensation table, but it also contains job title information.

To make our system more robust against lexical variations and table variations, we employed supervised machine learning in Step 1 and Step 2. As we know in supervised learning, one of the most challenging and time-consuming tasks is to obtain the labeled examples. To make our approach reusable across different domains, we developed a scheme that minimizes the human annotation effort needed.

For the tables containing the desired information, the exemplary embodiment uses the following annotations:
1. isGenuine: a flag indicates that this is a genuine table or a non-genuine table.
2. relations: the relations that a table contain, such as "name+title", "name+age", name+year+salary" or "name+year+bonus", or a combination of them.
3. isContinuous: a flag indicates that if this table is a continuation of the previous genuine table.
4. lastLabelRow: the row number of the last label row.
5. lastLabelColumn: the column number of the last label column associated with each relation.
6. valueColumn: the number of the column that contains the desired values for each relation.

The specified relations are used as training instances to build models for Step 1. The information lastLabelRow and lastLabelColumn are used to build models to classify rows and column as labels rows or columns in Step 2. In our guideline to annotators, we specifically ask them to annotate the column number of the last label column for each relation. The need for such fine-grained annotation is best illustrated using an example. In Table 3, for relation "name+title", the last label column is 1, the column "name and principal position". But for relation "name+year+bonus", the last label column is 3, "fiscal year". For extracting multiple relations in a table, these relations might share the same last label column, but this is not always the case. As a result, there is a need to annotate the associated label column for each relation separately. The flag isContinuous indicates if the current table is a continuation of the previous table. If it is, the current table can "borrow" the boxhead from previous table since such information is missing. We eliminate tables marked with "isContinuous" flag during training, but kept those table during evaluation. The annotation valueColumn can be used for automatic evaluation in the future.

There are few rare instances where the default arrangement of boxhead and stub, as shown in Table 3, are swapped in the corpus. Currently in our annotation, we simply don't supply "valueColumn" for the relations since they don't apply. For table classification and table understanding tasks, this is not of much an issue, but the above annotation scheme would need to be further modified to capture such difference.

Table classification: Much of past work in table classification focused on distinguishing between genuine and non-genuine tables (Wang & Hu 2002). For information extraction, we need to go a step further. We also need to know if a table contains the desired information before we perform expensive operations on it. To identify tables that contain desired relations, we employed LIBSVM (Chang & Lin 2001), a well-known implementation of support vector machine. Based on the annotated tables, a separate model is trained for each desired relation. In SEC domain, a table might contain multiple relations.

Exemplary Features Include:
top 1000 words inside tables in the corpus, and top 200 words in text preceding the tables. These thresholds are based on experiments using LIBSVM 5-fold cross validation. A stop word list was used.
number of words in tables that are label words
number of cells containing single word
number of cells containing numbers
maximum cell string size
number of names
number of label words in the first row We built a model for each desired relations. Because "name+year+salary" and "name+year+bonus" cooccur 100% of the time in the annotated corpus, the same classifier was for both relations. In this domain, the number of negative instances is significantly larger than positive instances (3building an accurate model. We suspected that having both signature tables and tables containing background information in sentences format create significant overlap between positive and negative instances. To address this, we only use a subset of negative instances for training (75% of our training instance are negative instances). We also trained a separate module for distinguish between a genuine and non-genuine tables based on annotated data. This second model is relation independent. The feature set is similar to the feature set mentioned above.

To identify which words are likely to be names, we downloaded the list of names from (U.S. Census Bureau). The list of names is further filtered by removing the common words, such as "white", "cook", or "president", based on a English word list (Atkinson August 2004). At our disposal, we also have a list of common title words. We intentionally do not use such information in this paper to make our result more generalizable to other domains.

We can imagine using such information would significantly improve the precision and recall for extracting relation "name+title".

Label row and column classification: Based on the annotated data, LIBSVM is again used to classify which rows belong to boxhead and which columns belong to stub. The training data for the models are words in the desired tables that were manually identified as box-head and stubs by using lastLabelRow and lastLabelColumn features. Other features used include the frequency of label words, the frequency of name words, and frequency of numbers.

For each relation, the exemplary embodiment uses a different label column classifier, since the lastColumnLabel might differ between different relations, as explained in the Annotation Section.

Table structure recognition: Because tables in the SEC filings are somewhat complex and formatted for visual purpose, a significant amount of effort is needed to normalize the table to facilitate later operations. Once label rows and columns are identified, several normalization operations are carried out:
1. create duplicate cells based on rowspan and columnspan
2. merge cells into coherent label cells
3. identify subheadings
4. split specific column based on conjoin marker, such as "and" or parenthesis (before last label column)
5. split cells containing multiple labels, such as years "2005, 2006, 2007"

Step 1 specifically addresses the issue with the use of columnspan and rowspan in HTML table, as have been done in (Chen, Tsai, & Tsai 2000). In Table 3, without copying the original labels into spanning cells, the label "annual compensation" would not be attached to the value "1,300,000" using just the HTML specification. By doing this step, we only need to associate all the labels in the box-head in that particular column to the value and ignore other columns.

In Step 2, we use certain layout information, such as underline, empty line, or background color, to determine when a label is really complete. In SEC filings, there are many instances where a label is broken up into multiple cells in the boxhead or stub. In those cases, we want to recreate the semantically meaningful labels to facilitate later relation extraction—a process that is heavily dependent on the quality of the labels attached to the values. For example, in Table 3, based on the separate in row 5, cells "John T. Chambers", "President, Chief Executive", and "Officer and Director" are merged into one cell, with line break marker (#) inserted into the original position. The new cell is "John T. Chambers#President, Chief Executive#Officer and Director", and it is stored in cell on row 2, and copied to cells on row 3 and 4.

In Step 4, heuristic rules were applied to identify subheader. For example, if there is no value in the whole row except for the first label cell, then that label cell is classified as subheader. The subheader label is assigned as part of the label to every cell below it until a new subheader label cell is encountered.

Step 5 splits certain columns into multiple columns to ensure that a value cell does not contain multiple values. For example, in Table 3, the first cell in first column is "name and principal position". The system detects the word "and" and split the column into two columns, "name" and "principal position", and do similar operations to all the cells in the original column. Remember in Step 3, cell on row 2 is the result of merge 3 cells, with line break markers between the string in the original cells. By default, we use the first line break marker to break the merged cell into two cells. After this transformation, we have "John T. Chambers" and "President, Chief . . . " that corresponding to "name" and "principal position". This type of operation is not only limited to "and", but also to certain parenthesis, "Nondirector Executive Officer (Age as of Feb. 28, 2006)". Such cells are broken into two, and so are the other cells in the same column.

Step 6 deals with repeated sequences in last label column. In Table 3, we are fortunate that all the cells under "fiscal year" contains only 1 value. There are instances in our corpus that such information is represented inside the same cell with line break between each value. In such cases, there are no lines between these values, and the resulting table looks cleaner and thus visually more pleasing. It is certainly incorrect to assign all 3 years "2005, 2004, 2003" to the cell containing bonus information "1,300,000". To address this, our system performs repeated sequence detection on all last label columns. If a sequence pattern, which doesn't always have to be exactly the same, is detected, the repeated sequence are broken into multiple cells so that each cell can be assigned to the associated value correctly.

Transforming a normalized table to Wang's representation (Wang 1996) is a trivial process. Given a value cell at (r,c), all the label cells in column (c) and row (r) are its associated labels. In addition, the labels in stub might also have additional associated labels in the boxhead, and those should be associated with the value cell also. For example, the value "1,300,000" will have following 4 associated labels: [annual compensation|bonus($)(1)], [fiscal year|2005], [principal position|president, chief executive officer and director], [name|John T. Chambers]. The characters "|" inside those associate labels indicate hierarchical relation between the labels. For tables with subheading, the subheading labels have already been inserted into all the associated labels in the stubs earlier.

Table understanding: Similar to (Gatterbauer et al. 2007), we consider IE from Wang's model requires further intelligent processing. To populate database based on Wang's representation, a rule-based system is used. We specifically look for certain patterns, such as "name", "title" or "position" in the associated labels in order to populate the "name–title" relation. For different relations, a different set of patterns is used. It's important to perform error analysis at this stage to detect ineffective patterns. For example, several tables with "name–title" information used the phrase "nondirector executive officer" instead of the label for "name". Clearly, we can apply supervised machine learning to make the process more robust. In our annotation, we have asked the annotators to identify the columns that contains the information we want in valueColumn. Such information might be used to train our table understanding module in the future.

The following procedures can be used to tailor our approach to a new application or domain:
  Collect a corpus and annotate the tables with the desired information as described in the Annotation section.
  Modify features to take advantage of knowledge in the new domain.
  Train all the classifiers. Depending on the size of the corpus, different thresholds can be specified to minimize the size of the vocabulary, which is used as features.
  This training process can be automated.
  Modify table normalization to take advantage of domain knowledge. For example, in SEC domain, separating the label cell "name and title" is applied in order to simply later relation extraction operations.
  Modify relation extraction rules. Different relations are signaled by different words in the labels. Currently, we manually specify these rules.

This process is designed to maximize precision and recall while minimizing the annotation effort. Each component can be modified to take advantage of the domain specific information to improve its performance.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:
1. A computer-implemented method comprising:
  accessing a preexisting entity list;
    analyzing by a computer a first document to detect an entity, the entity comprising a person, place, or organization, the first document being associated with a current legal event;
    resolving the entity with the preexisting entity list and:
    upon determining by the computer the entity is not present in the preexisting entity list, adding the entity to the preexisting entity list and generating a first set of relationship data associated with the relationship between the first document, the current legal event, and the entity, the first set of relationship data further comprising a set of information associated with the relationship between the entity and the current legal event; or upon determining by the computer the entity is present in the preexisting entity list, generating a first set of relationship data associated with a relationship between the first document and the entity, the first set of relationship data further comprising a set of information associated with the relationship between the entity and the current legal event;

repeating the resolving step for each distinct entity detected in the first document;

generating a second set of relationship data representing the relationship between the entity and a professional support resource comprising tools for creating and editing a work product document, the work product document comprising a reference to at least one of the resolved entities;

storing the first and second sets of relationship data in a memory associated with the computer;

displaying a user interface to allow a user to select from a set of professional support resources;

associating the reference to the at least one resolved entity with a smart tag; and editing the work product document in response to a signal representing a user input associated with the professional support resource and related to the smart tag.

2. The method of claim 1, wherein the detected entity is selected from the group consisting of: attorney names, judge names, courts, names of parties to a lawsuit, expert names, witness names, and law firm names.

3. The method of claim 1, wherein the first set of relationship data includes a first set of location data representing one or more locations in the first document in which the entity appears.

4. The method of claim 3, wherein the first set of location data includes character, line and page data representing locations in the first document at which the entity appears.

5. The method of claim 3 further comprising generating smart tags based on the first set of location data, whereby subsequent display of the first document includes displaying a set of smart tags at a set of locations in the first document associated with the entity.

6. The method of claim 5 further comprising:
in response to a report request, generating a signal based upon the set of smart tags; and
generating a computer display associated with the signal.

7. The method of claim 5 further comprising:
displaying a document having a smart tag;
presenting a user interface for allowing a user to delete a smart tag; and
in response to receiving a signal representing a user request to delete a smart tag, deleting the smart tag.

8. The method of claim 1 further comprising:
displaying a user interface to allow a user to select from a set of professional support resources; and
in response to a signal representing a user request, presenting a user with a selected professional support resource.

9. The method of claim 8, wherein the selected professional support resource is selected from the group consisting of: deposition outline; witness template; expert report template; and trial witness outline.

10. The method of claim 8, wherein the selected professional support resource is a network-based professional services provider system, the method further comprising:

presenting to a user a secure access user interface for providing secure access to the selected professional support resource.

11. The method of claim 1, wherein the preexisting entity list is associated with a database of entity records and wherein a plurality of entities are detected and a plurality of sets of relationship data are generated, the method further comprising:
associating respective sets of relationship data with respective entity records stored at the database.

12. The method of claim 1 further comprising:
displaying via a user interface a list of known entities; and
upon receiving an entity selection input, retrieving data associated with the selected entity and displaying information related to a set of documents associated with the selected entity by the first set of relationship data.

13. The method of claim 1, wherein the analyzing step includes using a statistical sequence decoder, including a viterbi decoder, to detect the entity.

14. The method of claim 1 further comprising:
presenting a user interface for receiving manual entry of entity data into the preexisting entity list.

15. The method of claim 1 further comprising:
prior to analyzing the first document, presenting to a user a list of documents from which to select for entity recognition;
receiving a signal representing a user selection of a set of documents on which to perform entity recognition including the first document.

16. A computer-implemented method comprising:
accessing a preexisting entity list;
analyzing by a computer a first document to detect an entity, the entity comprising a person, place, or organization, the first document being associated with a current legal event;
resolving the detected entity with the preexisting entity list and, if the detected entity is not present in the preexisting entity list, generating a list of new entities;
generating respective first sets of relationship data representing a relationship between the first document, the current legal event, and each respective detected entity, the respective first sets of relationship data further comprising respective sets of information associated with the relationship between each respective detected entity and the current legal event;
repeating the resolving step for each distinct entity detected in the first document and adding each distinct entity not present in the preexisting entity list to the list of new entities;
generating a second set of relationship data representing the relationship between the detected entity and a professional support resource comprising tools for creating and editing a work product document, the work product document comprising a reference to at least one of the resolved entities;
storing the respective first sets of relationship data and the second set of relationship data;
displaying a user interface to allow a user to select from a set of professional support resources;
associating the reference to the at least one resolved entity with a smart tag; and
editing the work product document in response to a signal representing a user input associated with the professional support resource and related to the smart tag.

17. The method of claim 16 further comprising:
displaying a user interface adapted to allow a user to select or deselect one or more of the new entities.

18. The method of claim 16 further comprising:

in response to a signal representing a user selection, adding to the preexisting entity list the new entities selected by a user.

19. The method of claim 16 further comprising:

determining a number of instances in which an entity is detected in the first document and presenting a user with a display indicating the number of instances.

20. The method of claim 16, wherein the first document comprises a set of two or more documents.

21. A non-transitory computer useable medium having a set of executable code for enabling electronic communications between a word processing program of a client access device and an information services provider system (ISP), the set of executable code comprising:

a first set of computer program code adapted to access a preexisting entity list;

a second set of computer program code adapted to analyze a first document to detect an entity, the entity comprising a person, place, or organization, the first document being associated with a current legal event;

a third set of computer program code adapted to resolve the entity with the preexisting entity list and:

upon determining the entity is not present in the preexisting entity list, adding the entity to the preexisting entity list and generating a first set of relationship data associated with the relationship between the first document and the entity, the first set of relationship data further comprising a set of information associated with the relationship between the entity and the current legal event; or upon determining the entity is present in the preexisting entity list, generating a first set of relationship data associated with a relationship between the first document and the entity, the first set of relationship data further comprising a set of information associated with the relationship between the entity and the current legal event;

a fourth set of computer program code adapted to repeat the resolving step for each distinct entity detected in the first document;

a fifth set of computer program code adapted to generate a second set of relationship data representing the relationship between the entity and a professional support resource comprising tools for creating and editing a work product document, the work product document comprising a reference to at least one of the resolved entities;

a sixth set of computer program code adapted to store the first and second sets of relationship data;

a seventh set of computer program code adapted to display a user interface to allow a user to select from a set of professional support resources;

an eighth set of computer program code adapted to associate the reference to the at least one resolved entity with a smart tag; and a ninth set of computer program code adapted to edit the work product document in response to a signal representing a user input associated with the professional support resource and related to the smart tag.

22. The non-transitory computer useable medium of claim 21 further comprising a tenth set of computer program code adapted to generate smart tags based on the first set of relationship data, whereby subsequent display of the first document includes displaying a set of smart tags at a set of locations in the first document associated with the entity.

23. The non-transitory computer useable medium of claim 22 further comprising:

a eleventh set of computer program code adapted to generate, in response to a report request, a signal based upon the set of smart tags; and an twelfth set of computer program code adapted to generate a computer display associated with the signal.

24. The non-transitory computer useable medium of claim 23 further comprising:

a thirteenth set of computer program code adapted to cause a display of a document having a smart tag;

a fourteenth set of computer program code adapted to present a user interface for allowing a user to delete a smart tag; and a fifteenth set of computer program code adapted to delete a smart tag in response to receiving a signal representing a user request to delete the smart tag.

25. The non-transitory computer useable medium of claim 21 further comprising:

a tenth set of computer program code adapted to displaying a user interface to allow a user to select from a set of professional support resources; and a eleventh set of computer program code adapted to present a user with a selected professional support resource in response to a signal representing a user request.

26. A non-transitory computer useable medium comprising:

a first set of computer program code adapted to accessing a preexisting entity list;

a second set of computer program code adapted to analyze a first document to detect an entity, the entity comprising a person, place, or organization, the first document being associated with a current legal event;

a third set of computer program code adapted to resolve the detected entity with the preexisting entity list and, if the detected entity is not present in the preexisting entity list, generating a list of new entities;

a fourth set of computer program code adapted to generate respective first sets of relationship data representing a relationship between the first document, the current legal event, and each respective detected entity, the respective first sets of relationship data further comprising respective sets of information associated with the relationship between each respective detected entity and the current legal event;

a fifth set of computer program code adapted to repeat the resolving step for each distinct entity detected in the first document and adding each distinct entity not present in the preexisting entity list to the list of new entities;

a sixth set of computer program code adapted to generate a second set of relationship data representing the relationship between the detected entity and a professional support resource comprising tools for creating and editing a work product document, the work product document comprising a reference to at least one of the resolved entities;

a seventh set of computer program code adapted to store the respective first sets of relationship data and the second set of relationship data;

an eighth set of computer program code adapted to display a user interface to allow a user to select from a set of professional support resources;

a ninth set of computer program code adapted to identify the reference to the at least one resolved entity with a smart tag; and a tenth set of computer program code adapted to edit the work product document in response to a signal representing a user input associated with the professional support resource and related to the smart tag.

27. The non-transitory computer useable medium of claim 26 further comprising:
an eleventh set of computer program code adapted to display a user interface adapted to allow a user to select or deselect one or more of the new entities.

28. The non-transitory computer useable medium of claim 26 further comprising:
a twelfth set of computer program code adapted to add to the preexisting entity list the new entities selected by a user in response to a signal representing a user selection.

29. A computer-implemented method comprising:
analyzing a first document to detect entities appearing in the document, the first document being associated with current legal event;
detecting a first entity in the first document;
generating a first set of relationship data representing a relationship between the first document, the current legal event, and the detected first entity, the first set of relationship data further comprising a set of information associated with the relationship between the entity and the current legal event;
comparing the detected first entity with a set of entity data derived from an existing authority database of known entities;
generating a second set of relationship data representing the relationship between the first entity and a professional support resource comprising tools for creating and editing a work product document, the work product document comprising a reference to at least one of the resolved entities;
updating the authority database of known entities including storing the first and second sets of relationship data;
displaying a user interface to allow a user to select from a set of professional support resources;
associating the reference to the at least one resolved entity with a smart tag; and
editing the work product document in response to a signal representing a user input associated with the professional support resource and related to the smart tag.

\* \* \* \* \*